United States Patent
Curtis

(10) Patent No.: US 9,841,238 B2
(45) Date of Patent: Dec. 12, 2017

(54) DIRECT FORCED DRAFT FLUID COOLING TOWER

(71) Applicant: Syntech Towers, LLC, Prairieville, LA (US)

(72) Inventor: Harold Dean Curtis, Oklahoma City, OK (US)

(73) Assignee: Syntech Towers, L.L.C., Prairieville, LA (US)

( * ) Notice: Subject to any disclaimer, the term of this patent is extended or adjusted under 35 U.S.C. 154(b) by 0 days.

(21) Appl. No.: 15/379,732

(22) Filed: Dec. 15, 2016

(65) Prior Publication Data

US 2017/0146297 A1    May 25, 2017

Related U.S. Application Data

(60) Continuation of application No. 14/806,364, filed on Jul. 22, 2015, now abandoned, which is a continuation-in-part of application No. 14/660,871, filed on Mar. 17, 2015, which is a division of application No. 13/148,541, filed as application No. PCT/US2010/024929 on Feb. 22, 2010, now Pat. No.
(Continued)

(51) Int. Cl.
| | |
|---|---|
| *F28C 1/02* | (2006.01) |
| *F24F 5/00* | (2006.01) |
| *F28D 5/02* | (2006.01) |
| *F28F 25/04* | (2006.01) |
| *F28F 25/10* | (2006.01) |
| *F28F 25/00* | (2006.01) |

(52) U.S. Cl.
CPC .............. *F28C 1/02* (2013.01); *F24F 5/0035* (2013.01); *F28D 5/02* (2013.01); *F28F 25/04* (2013.01); *F28F 25/10* (2013.01); *F28F 2025/005* (2013.01)

(58) Field of Classification Search
CPC .. F24F 5/0035; F28C 1/00; F28C 1/02; F28C 1/16; F28D 5/02; F28F 25/02; F28F 25/04; F28F 25/10; F28F 2025/005; Y10T 137/8593
USPC ..................................... 261/29, 30, DIG. 11
See application file for complete search history.

(56) References Cited

U.S. PATENT DOCUMENTS

| | | | |
|---|---|---|---|
| 3,384,165 A * | 5/1968 | Mathews | F28B 1/06 165/122 |
| 4,198,215 A * | 4/1980 | Regehr | B01D 45/08 55/440 |

(Continued)

FOREIGN PATENT DOCUMENTS

| | | | |
|---|---|---|---|
| GB | 689805 | * | 4/1953 |
| JP | 49-11345 | * | 1/1974 |
| JP | 2003-314972 | * | 11/2003 |

*Primary Examiner* — Charles Bushey
(74) *Attorney, Agent, or Firm* — Jones Walker LLP

(57) ABSTRACT

A cooling tower is provided with a housing containing a fan at the bottom of the tower, and a plurality of layers of water collection troughs or channels above the fan to capture water droplets sprayed downwardly from the top of the device through an evaporative cooling pad located above the collection troughs. The collection troughs extend from one side of the housing to the other in the form of a structural support for the housing and the equipment therein. The troughs have open ends which extend through the housing to discharge collected water to an adjacent vertical tank.

24 Claims, 25 Drawing Sheets

Related U.S. Application Data

9,033,318, application No. 15/379,732, which is a continuation of application No. 14/806,364, filed on Jul. 22, 2015, now abandoned.

(60) Provisional application No. 61/208,995, filed on Mar. 3, 2009, provisional application No. 61/217,822, filed on Jun. 5, 2009, provisional application No. 61/270,723, filed on Jul. 13, 2009, provisional application No. 62/125,943, filed on Feb. 5, 2015, provisional application No. 62/125,941, filed on Feb. 5, 2015.

(56) References Cited

U.S. PATENT DOCUMENTS

| | | | | |
|---|---|---|---|---|
| 5,545,356 A * | 8/1996 | Curtis | ............... | E04H 5/12 261/111 |
| 5,958,306 A * | 9/1999 | Curtis | ............... | F28F 25/02 261/112.2 |
| 8,585,024 B2 * | 11/2013 | Ferree | ............... | F28C 1/02 261/109 |
| 9,033,318 B2 * | 5/2015 | Curtis | ............... | F28D 5/02 261/110 |
| 9,562,729 B2 * | 2/2017 | Curtis | ............... | F28D 5/02 |
| 9,568,248 B2 * | 2/2017 | Curtis | ............... | F28C 1/02 |
| 2015/0241148 A1 * | 8/2015 | Curtis | ............... | F28D 5/02 165/104.21 |
| 2015/0276318 A1 * | 10/2015 | Marks | ............... | F28C 1/00 261/89 |
| 2015/0330710 A1 * | 11/2015 | Curtis | ............... | F28C 1/02 261/29 |

* cited by examiner

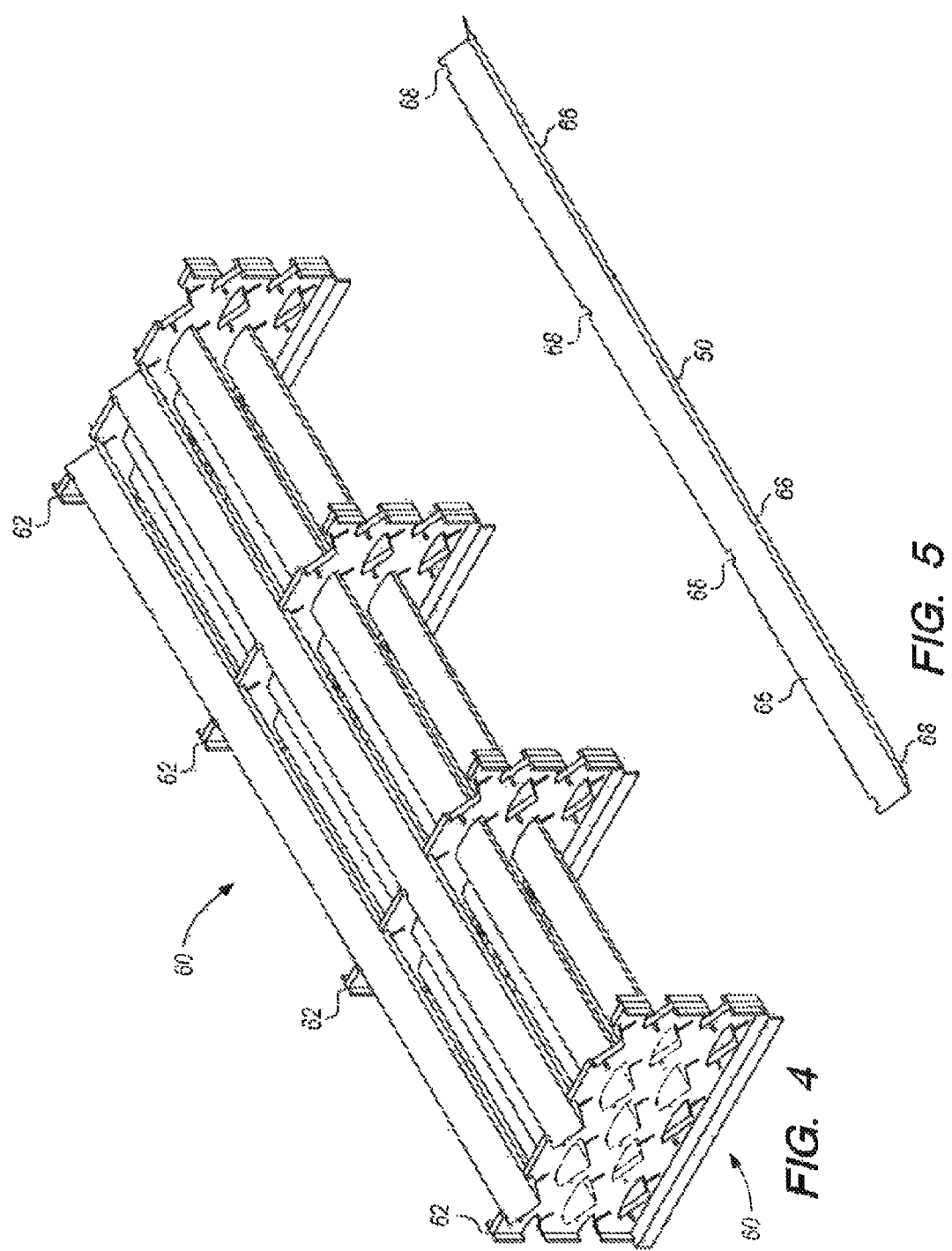

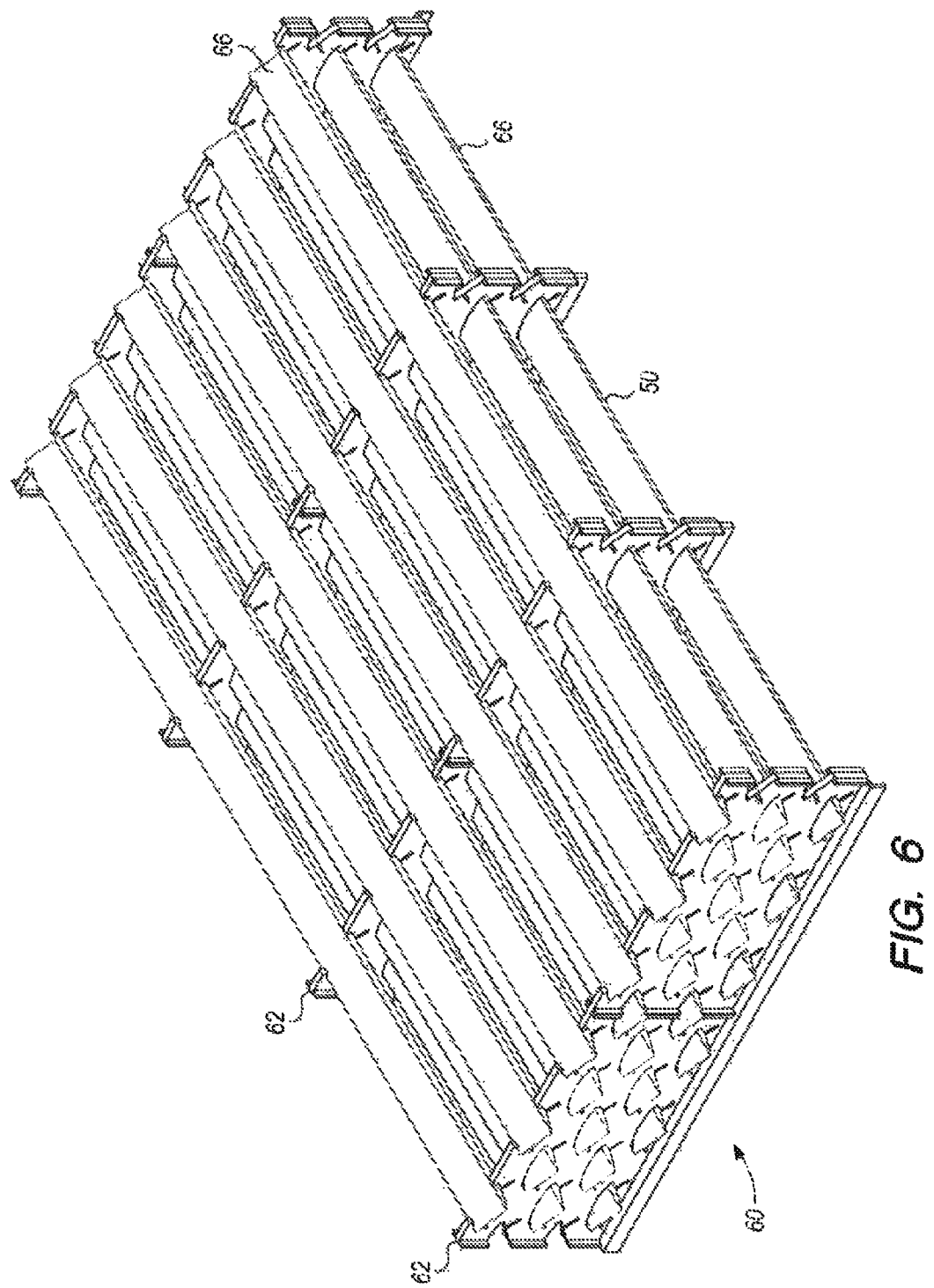

DIRECT FORCED DRAFT FLUID COOLING TOWER

CROSS-REFERENCE TO RELATED APPLICATIONS

This application is a continuation of U.S. patent application Ser. No. 14/806,364 filed Jul. 22, 2015, now abandoned, which is a continuation-in-part of U.S. patent application Ser. No. 14/660,871 filed Mar. 17, 2015 which issued as U.S. Pat. No. 9,644,904, which is a divisional application of U.S. patent application Ser. No. 13/148,541 filed Sep. 13, 2011 which issued as U.S. Pat. No. 9,033,318, which is a 371 of PCT/US2010/024929 filed Feb. 22, 2010, which claims priority to U.S. Provisional Application Nos. 61/208,995 filed Mar. 3, 2009; 61/217,822, filed Jun. 5, 2009; and 61/270,723 filed Jul. 13, 2009, and this application is a continuation of U.S. patent application Ser. No. 14/806,364 filed Jul. 22, 2015, which claims the benefit of U.S. Provisional Application Nos. 62/125,943 and 62/125,941 filed Feb. 5, 2015, the disclosures of which are all incorporated herein by reference.

BACKGROUND OF THE INVENTION

The present invention relates generally to modular direct forced draft fluid cooling towers using an improved air diffusing water drainage collection system as a structural member in such cooling towers and which modular towers can be connected together for increased capacity.

DESCRIPTION OF THE PRIOR ART

Conventional types of industrial cooling towers include so-called counterflow towers wherein water or other liquid falls or is sprayed downward in the tower counter flow to air moving upwardly in the tower, in the opposite direction. Typically such industrial cooling towers are quite large and permanent installations which include very large bottom sumps or water basins for collecting the falling water. Such collecting sumps or basins are typically built below grade of concrete, are expensive to construct and time consuming to build. They require the use of vertical pumps and below grade piping which add further expense. In addition such sumps become sediment basins that have to be cleaned periodically, with great difficulty.

Such previously proposed towers are constructed from metal, wood, fiberglass and/or concrete. The latter are the most expensive and, consequently, share only the upper end of the market. As these towers have grown larger, they can reach dimensions of 36 or 48 feet square or more. Often they are rectangular in shape and require large internal horizontal structural members, vertical columns, braces and tie lines to support the tower's internal parts and side walls, thereby significantly adding to expense. Such internal structural elements result in the need to cut and notch the typical fill material used in cooling towers in the field. This is not only expensive but when replacement is required repairs are difficult and expensive. Moreover the down coming water can channel in or contact the support members thereby reducing thermal efficiency. Indeed it has been found that conventional concrete cooling towers can cost about two and one half that of stick built towers.

Some relatively small cooling towers have been built which are transportable, for various applications, such as small rooftop towers. For example, U.S. Pat. Nos. 5,227,095 and 5,487,531 issued to Harold D. Curtis, disclose individual modular towers of a size that can be readily transported, prefabricated at a factory, and then easily assembled at a field site to provide the capacity required by the particular water/liquid cooling or treatment project at the site. The systems disclosed in the Curtis patents have a fan or fans for supplying air to the tower located in the bottom of the tower below the fill or evaporative cooling media. The fans force air directly upward in the tower. These systems are referred to generally as direct forced draft counterflow cooling towers.

Another modular type of direct forced draft counterflow cooling tower with bottom fans is disclosed in U.S. Pat. No. 5,545,356.

Each of these systems uses a large water or liquid collection basin, sump or reservoir to collect and contain the circulating water for the system. These basins or sumps are typically very large because they have to contain enough liquid to charge the cooling system in which this cooled liquid is used, including all associated piping. Because the process liquid (often, but not always, water) in these systems will scrub the air and also collect airborne particles, such particles will settle out in the basins, sumps or reservoirs which then have to be periodically cleaned and the large volume of liquid in the system dumped, cleaned or disposed of In essence, even in such smaller units these basins, sumps and reservoirs become internal sediment basins. Such basins are maintenance intense and require workers to enter and work in a confined space to perform cleaning.

Many of these previously proposed cooling towers utilized water collection systems beneath the fill media to collect water leaving the fill and convey it to a sump. These generally consist of a series of trough like devices that convey the water to an internal gutter which then directs the water to the sump or basin, thus occupying additional space in the tower, reducing the tower's cooling capacity.

In addition to the issues of sedimentation and liquid volume, previously proposed tower systems have not adequately addressed the problem of air diffusion by their respective liquid collection systems. Generally, cooling tower (or other forms of towers like fluid coolers) efficiency is determined by how well the upflowing air is mixed with the downcoming liquid. The fans in such systems are, of course, round and the air is not evenly distributed across the tower media or elements since the fans do not deliver a balanced air flow. Thus, for example, in the systems disclosed in U.S. Pat. Nos. 5,227,095 and 5,487,531 a plurality of parallel elongated collection plates are used in the liquid collector which are sloped and overlap. These plates limit, if not block off, air flow on the wall areas of the tower and cause the air to enter the fill media, or heat exchange fluid cooler coils above it, at an angle which forces much of the air to one side of the tower or housing. These factors significantly affect the quality of the air entering the tower and thus reduces thermal performance of the tower.

SUMMARY OF THE INVENTION

In accordance with the inventions disclosed in U.S. patent application Ser. No. 13/148,541 and its parent application identified above, low profile, transportable cooling towers are disclosed which include a novel water/liquid collector/air diffuser system located above one or more fans in the base of the tower housing. The liquid collector of such systems is positioned below the fill media in the tower to collect substantially all of the liquid flowing through the fill media and direct the same to an internal gutter, or gutters, which supply the collected liquid to an external collection tank from which the cooled liquid is circulated to an external heat transfer device for cooling a heat source and then returned to the top of the tower. The liquid collector also serves to diffuse air from the fans across the width of the tower so that air flow through the fill media is uniform. In one aspect of the present invention an improved cooling tower structure is provided which eliminates the presence of internal gutters to collect the liquid.

The just described water/liquid collector and air diffuser for use in a low profile transportable cooling tower is formed from a plurality of elongated V or U shaped laterally spaced troughs which form or define channels arrayed in a plurality of layers. The troughs in each layer are offset from the troughs in the layers above or below it to capture substantially all downflowing liquid in the tower to provide substantially a 100% complete wet/dry barrier between the fill media or heat exchanger and the fans while producing a uniform diffusion of air flowing upwardly.

In addition to collecting all of the downcoming liquid the liquid collection system provides a low-pressure means for the air to flow vertically up between the liquid collection troughs and into the cooling media. The channel forming troughs are strategically positioned to direct and defuse the upflowing air to enhance even airflow through the fill media. This creates a much more efficient air to liquid mixture, significantly improving thermal performance of the cooling tower. In addition, such liquid collectors will reduce the pressure drop as compared to the existing technology. This will further increase thermal performance of the cooling tower. Moreover, such liquid collector systems can be produced much more economically than the present technology.

As a result of the structures of liquid collection/air diffuser system of U.S. patent application Ser. No. 13/148,541 the use of sumps, basins or reservoirs below and around the bottom fans of the towers is eliminated, thereby further reducing the height and weight of the towers. This also reduces the cost of manufacturing the units.

Utilizing the liquid collection/air diffuser system of the type disclosed in U.S. patent application Ser. No. 13/148,541 provides numerous additional operational advantages as described in detail therein, compared to induced draft counterflow water cooling towers which are now most commonly used in the industry. Such cooling towers can be factory assembled for shipping and rooftop installations for use in air conditioning systems. In addition, it has been found that such liquid collection systems are useful in larger cooling tower structures as described hereinafter.

In summary, the water collection system of U.S. patent application Ser. No. 13/148,541, when utilized in water operated equipment, offers many cost saving features as well as eliminating health and safety risk associated with water equipment including:

Increased thermal performance
Reduced energy consumption
Reduced maintenance and increased equipment longevity
Elimination of air intake louvers
Elimination of plenum chamber
Reduced structural height of equipment
Elimination of below ground liquid sumps or basins
Reduced manufacturing cost
Removal of fan equipment from wetted exhaust air stream
Elimination of pump cavitations
Environmentally friendly
Elimination of need to enter the wetted area to service a basin or fans Despite the advantages of the water/liquid collector/air diffuser described in U.S. patent application Ser. No. 13/148,541 such liquid collectors/diffusers have not been adapted for large scale cooling towers. In accordance with another aspect of the present invention water/liquid collectors/air diffusers of the general form disclosed therein are adapted for use in large cooling towers as structural members with the result that such large scale towers can be competitively priced with stick built wood and fiberglass cooling towers. Such larger scale towers can be made from poured in place concrete, precast concrete panels or concrete blocks and even cargo containers, without the need for additional internal support structures for the enclosure. In addition, they can be made as separate independent but connectable units to increase capacity.

In one preferred form the housing for the tower is created using concrete blocks because these are built by masonry crews and do not require large work areas, cranes or other special construction equipment. Multiple crews can be used to build multiple modules at the same time to expedite construction as there are no material flows or work flow bottlenecks as experienced with poured in place or even precast concrete. In addition concrete block construction can be used to match the architectural design of accompanying buildings and is the most competitively priced construction method. Such larger towers can be built in any size but in the modular form units of about 24 feet by 24 feet are satisfactory. These can be used preferably in the industrial and utility markets.

In accordance with another embodiment of the invention cooling towers may be formed in ocean cargo containers using the water/liquid collectors/air diffusers as internal structural members with the containers being either movably connected to vertical water collection basins or having the basins mounted within the container itself. These basins can be moved between retracted and extended positions relative to the cargo container whereby in the retracted position the cooling tower can be readily transported on a cargo vessel or standard trucking for shipping. In the extended position the water basins vertically support the container above grade level to provide space for air to enter the tower. Cooling towers and other water equipment typically have to have their water basins shipped separately or provision must be made for over-height permit loads. The retractable vertical water basins of the present invention eliminates this expensive and cumbersome task. Such units are readily transported and would be suitable for temporary uses such as rental units, permanent installations, or for shipment to the international market.

As noted above, cooling towers and other water equipment typically utilize a water basin located beneath the equipment. These water basins serve as a reservoir to contain a certain volume of water required to charge the water system. This volume of water is necessary to provide a water source to fill and charge the piping system whenever the equipment is turned on. These basins also serve as a sediment basin to collect the numerous water borne solids and particles that are in the water stream. A portion of the muds, sand, debris and other contaminants settle into the bottom areas of the water basins and have to be periodically cleaned. The basins are open to the elements and air borne debris often enters these basins and sometimes gets lodged in the pumps, piping or water nozzles, causing fouling problems Cleaning and maintaining opened water basins are maintenance intensified, environmentally unfriendly, and expensive to construct.

The present invention eliminates the opened water basins located below the cooling equipment and replaces the water basin with an enclosed vertical water basin located on one, two or four sides of the equipment structure. The size of these basins can vary according to the water volume required for each system. These enclosed water basins can also provide a support structure to elevate the equipment module above grade level to provide means for air flow to enter the module.

Yet another advantage of the modular cooling tower structure of the present invention is that all forms of the invention use the same internal components (i.e. a fan or fans, a water collection system forming a structural beam, fill media water distribution piping and nozzles, and drift eliminator) with the principal variable being the form of the housing. This is to be contrasted with current industry practice of making a large variety of different sized and shaped towers having different internal components making them extremely expensive and difficult to make, manage and produce. The present invention provides standardized parts and shapes and the ability to vary capacity.

OBJECTS OF THE INVENTION

It is an object of the invention is to provide a large scale permanent cooling tower installation containing an improved air diffuser and liquid collection system as a structural support member for the tower.

Another object of the invention is to provide an improved transportable cooling tower.

A further object of the invention is to provide improved large scale cooling towers with a liquid collection system that facilitates cleaning.

The above and other objects, features and advantages of the present invention will be apparent to those skilled in the art from the following detailed description of illustrative embodiments thereof when read in conjunction with the accompanying drawings therein.

BRIEF DESCRIPTION OF THE DRAWINGS

FIG. 4 is a perspective view of one section of a water/liquid collector (also referred to as water collection unit or system) made in accordance with the present invention;

FIG. 5 is an enlarged perspective view of one of the water troughs used in the collector unit of FIG. 4;

FIG. 6 is a perspective view, similar to FIG. 4, of a pair of water collector sections connected together, using the troughs of FIG. 5;

DETAILED DESCRIPTION OF THE PREFERRED EMBODIMENTS

Figure 1:
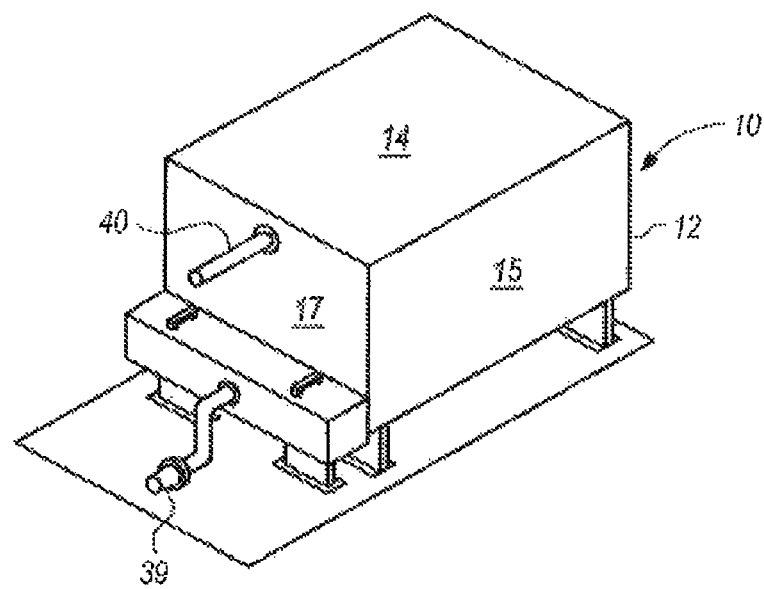
FIG. 1 is a perspective view of a direct forced draft/fluid cooling tower constructed in accordance with the disclosure of U.S. patent application Ser. No. 14/660,871.
Figure 2:
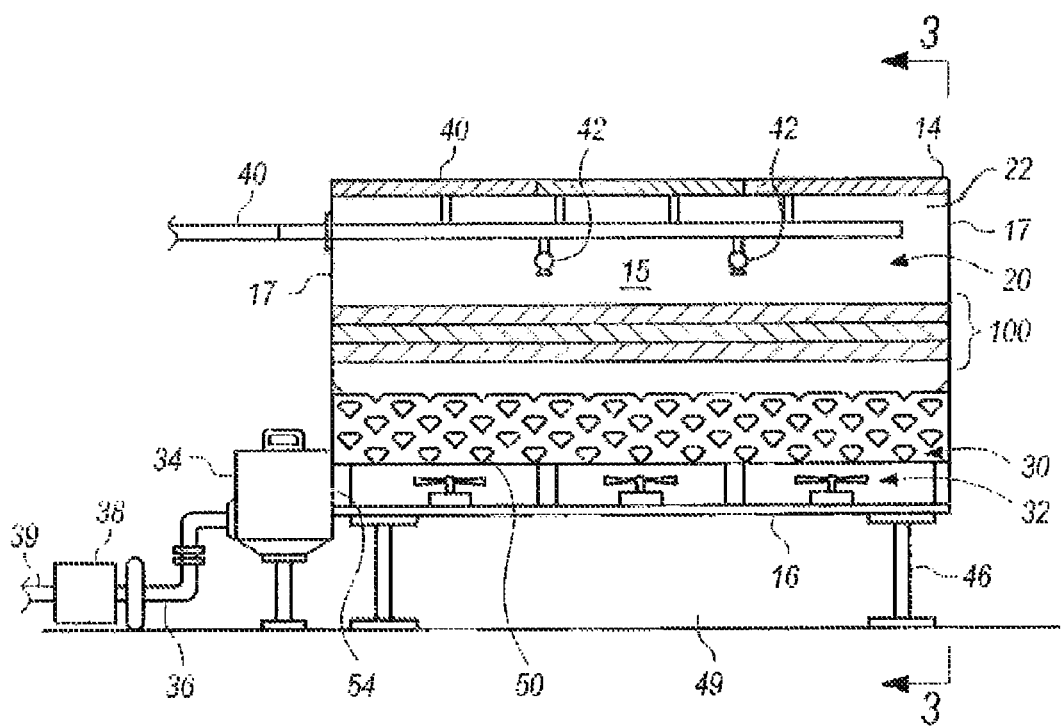
FIG. 2 is a side elevational view, with the sidewall removed, of the cooling tower as shown in FIG. 1.

Referring now to the drawings in detail, and initially to FIG. 1, a direct draft cooling tower 10 as described in U.S. patent application Ser. No. 14/660,801 is illustrated. The cooling tower is designed to advantageously use the evaporation of water or other liquids to cool the liquids. The cooling tower includes an exterior housing 12 having an open top 14, vertical side walls 15, and end walls 17. As seen in FIG. 2, wherein a side wall 15 has been removed to illustrate the interior, housing 12 contains a liquid distribution system 20 at its upper end 22.

In an evaporative cooling tower as shown the liquid from distribution system 20 is passed countercurrent through an evaporative cooling media of well-known construction forming a layer 100 in the housing 12. The evaporative cooling media can take many forms, and typically could be cross-corrugated sheets of plastic material which form air passageways therebetween through which the liquid and air pass countercurrently. The moisture evaporates in the media as it contacts the air thereby cooling the liquid for use in air-conditioning systems and the like.

A water collector unit/system 30 also is located within housing 12 below the evaporative cooling media 100 for collecting water that passes through the spaces in the cooling media from the water distribution system 20. One or more fans 32 are provided in the bottom of housing 12, supported therein in any convenient manner, for example by a perforated bottom wall or cross structures 16 which allows the fans to draw air into the cooling tower from the space 49 below the fans. The air drawn through the bottom opening of the housing is blown through the water collector unit 30 and the media 100 countercurrent to the water distributed from distribution system 20. As described hereinafter fans 32 could be suspended from the collector unit or from a fan shroud mounted to the side walls of housing 12.

Water distribution system 20 includes a collection tank 34 mounted outside the housing 12 at the approximate level of the fans to receive water collected by water collection unit/system 30, as described hereinafter. The cooled collected water is discharged from the tank 34 through a discharge pipe 36 to a pump 38 which discharges the water through an outlet 39 to a heat exchanger or the like to cool air, for example, in an air conditioning system. The pump also serves to recirculate returning liquid to the inlet distribution pipe 40 to which a plurality of nozzles 42 are connected inside the housing. These nozzles create a downward spray of water in the housing above fill media 100. These nozzles may be of any known construction, suitable for use in cooling towers and evaporative cooler devices, but preferably are spray nozzles of the type disclosed in PCT International Publication No. WO2009/070691.

A known form of drift eliminator structure 44 is mounted in the opened top 14 of housing 12 to intercept, trap and collect mist blown through the fill media 100 to prevent the mist from escaping to the atmosphere. Such drift eliminators are well known in the art and need not be described here in detail. Examples of suitable drift eliminators are shown and described in U.S. Pat. Nos. 5,227,095 and 5,487,531, along with their mountings. The disclosures of those two patents are incorporated herein by reference.

Figure 3:
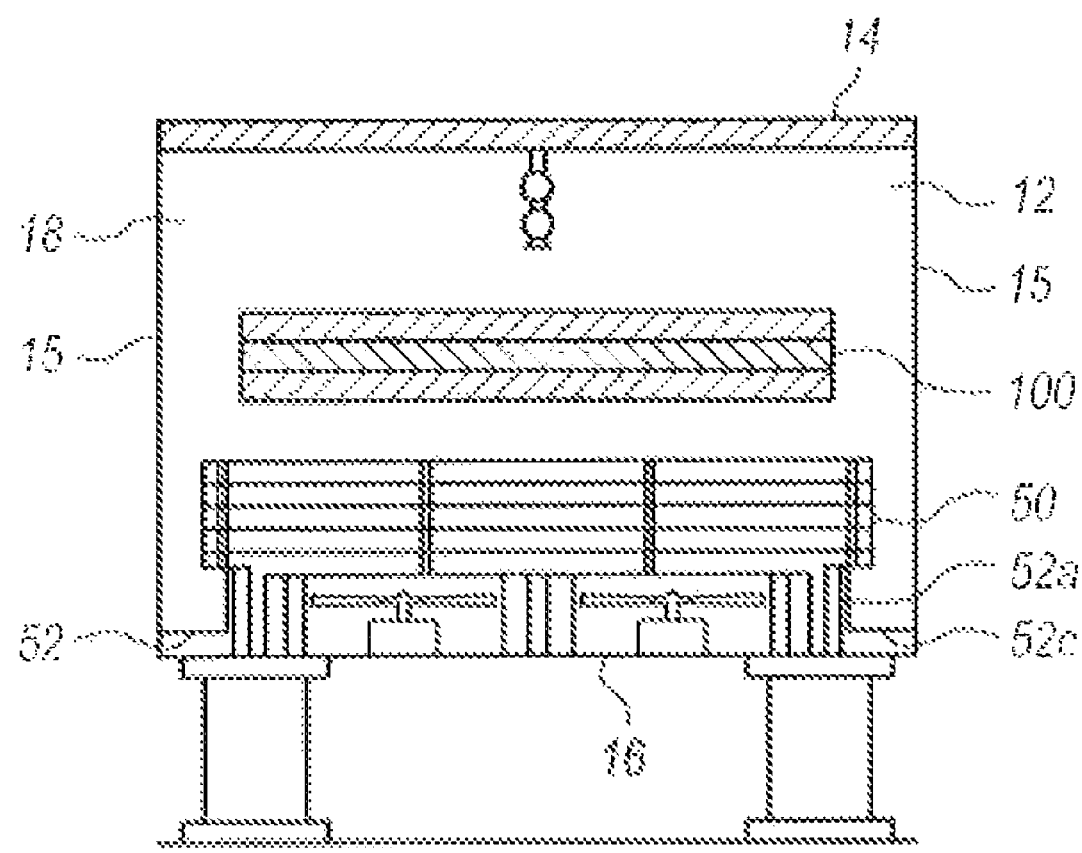
FIG. 3 is a sectional view taken along line 3-3 of FIG. 2.

As illustrated in FIGS. 2 and 3, housing 12 (which can be formed of light weight galvanized metal or the like) and the equipment mounted therein are supported by a pair of I-beams 46, or any other convenient form of foundational support, on the floor or on the ground, or, for example, the roof of a building. Thus the bottom of housing 12 is spaced from the floor support to allow air to flow into the space 49.

FIG. 3 of the drawings is a view taken along the line 3-3 of FIG. 2 with a wall 17 of the housing removed to expose the interior. As seen in FIGS. 2 and 3, the water collector unit/system 30 includes a plurality of V-shaped troughs 50 arrayed in multiple layers as described in greater detail hereafter. These troughs collect the liquid passing through the media 100 to intercept the liquid and direct it away from fans 32. As illustrated in FIG. 3, the ends of the troughs 50 are open and the unit 30 is supported on an L-shaped wall structure 52 at each side of housing 12. This L shaped wall structure extends along the length of the housing and, with the adjacent side wall of the housing, forms gutters on opposite sides of the housing. The two gutters carry the water to openings 54 adjacent tank 34, which openings are connected through waterproof seals or the like to corresponding openings in the tank so that the collected water flows into the tank and can be recirculated as described above.

Referring now to FIG. 4 of the drawings, an enlarged perspective view of a section or portion 60 of the water collector system 30 is illustrated. FIG. 5 is an isolated view of one of the troughs 50. The entire water/liquid collector unit 30 is formed of a plurality of water collector sections 60, as seen in FIG. 4, connected together, as seen in FIG. 6. Each of the sections 60 consists of a plurality of trough support plates or structures 62 having openings 64 therein for receiving troughs 50. These support plates may be formed of lightweight molded plastic, fiberglass, or the like. In the illustrative embodiment, four support plates are provided, but the number of support plates will be dependent on the size of a unit. In the embodiment of the invention illustrated in FIGS. 4 and 5 troughs 50 are generally V-shaped and formed of a flexible metal, plastic or fiberglass material which allows the legs 66 of the trough to flex for convenience in engaging the troughs in the support plates.

Figure 7:
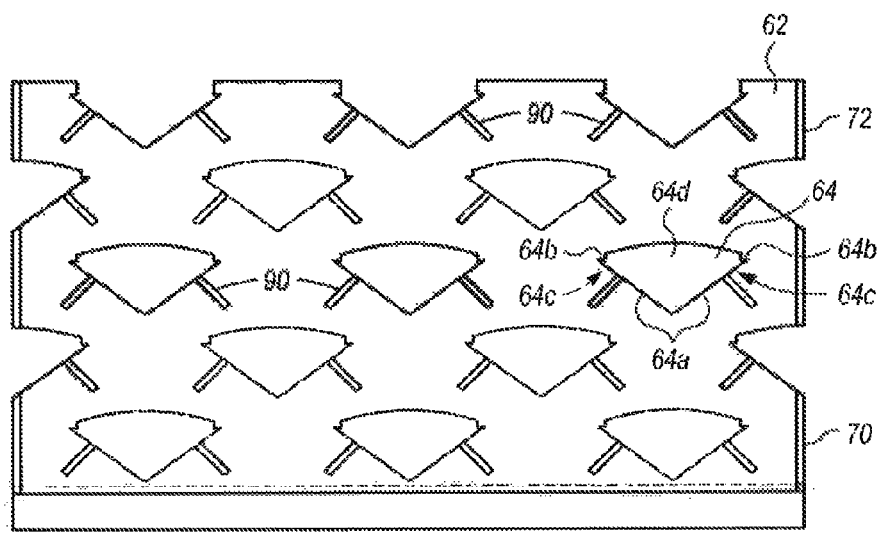
FIG. 7 is an enlarged plan view of a connector plate used in the connector section shown in FIG. 4.

A more detailed view of a support plate 62 is shown in FIG. 7, wherein it is seen that the openings 64 in the plate have a generally V-shaped bottom peripheral configuration that is complementary to the V-shaped configuration of the troughs 50. The V-shaped edges 64a of opening 64 terminate at abutments 64b which form notches 64c in the plate at the ends of the edges 64a. The top edge 64d of the opening 64 is slightly arched. This structure allows the flexible V-shaped trough to be slightly bent so that its legs 66 approach one another slightly and thus can be inserted longitudinally in openings 64. When the trough is properly positioned in the opening plate openings the notches 68, formed in its legs 66 will snap into place beneath the notches 64c in the plates. This arrangement provides a cooperating means in the water collector system to hold the troughs in the support plates and to stabilize the plates themselves.

The slot and notch design of this system allows for assembly without utilizing mechanical fasteners while maintaining the structural integrity of the modules. It also provides for ease of removal.

Figure 8:
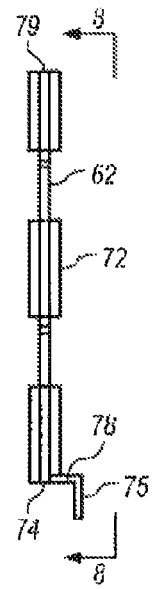
FIG. 8 is an end view of the connector plate taken along line 9-9 of FIG. 7.

Referring to FIGS. 7 and 8, the ends 70 of the plates 62 have transverse wall elements 72 formed thereon. These wall elements will abut one another when a plurality of the water collector sections 60 are positioned in the housing, as shown in FIG. 6. In addition, as seen in FIGS. 4, 6 and 7, the edges 70 of the support plates have partial openings 64 formed therein that are complementary to a corresponding partial opening on an adjacent plate so that when the plate ends they abut they form a complete opening between them. By this arrangement, when a V-shaped trough element 50 is snapped into that opening, the trough itself forms a connection between the two support plates and serves to connect the water collector sections 60 together.

As seen in FIG. 8, the bottom edge 74 of the support plate 62 has a thin, offset wall 75 extending therefrom providing a support surface 78 on bottom edge 74 which can rest on the top edge of gutter wall 52a for support thereon. In addition, if more than one layer of collection units is used, the units can stack on one another with the support surface 78 resting on the upper edge 79 of plate 62.

Although the illustrative embodiment of FIG. 7 utilizes V-shaped troughs 50 as described above to provide liquid collection channels to lead the collected liquid to the gutters, it should be understood that other convenient shapes such as U-shaped troughs can be used as well. In addition although, as illustrated in FIG. 3, the opposed ends of the troughs are open to supply the water to a pair of gutters, if desired, one end of the troughs can be closed so that all of the liquid is supplied to a single gutter in the housing.

Figure 9:
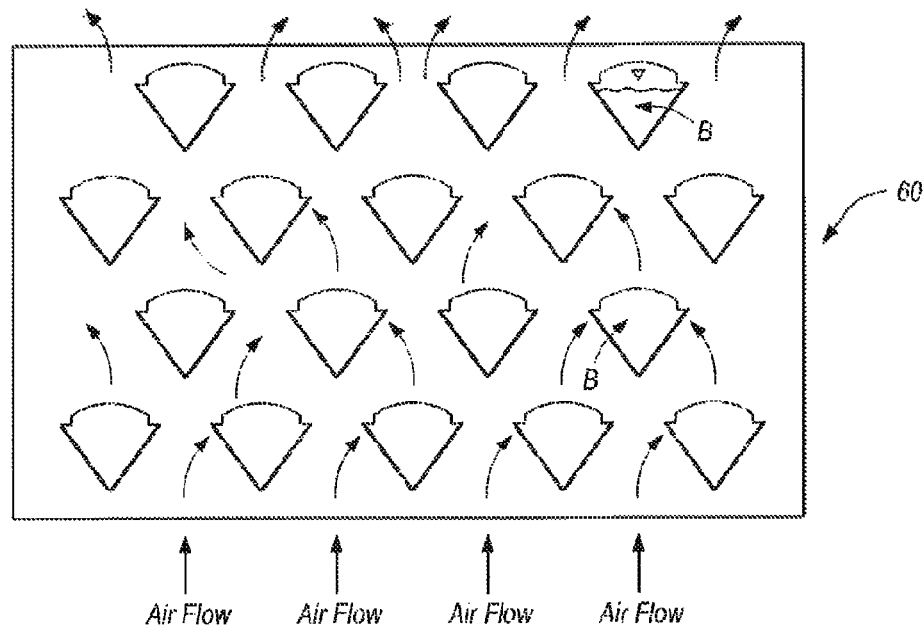
FIG. 9 is a schematic end view of one section of the water collection unit showing the relationship of the water troughs to each other and the air flow paths therethrough.

Referring now to FIG. 9, a schematic illustration of the array of the troughs in the water collector section 60 is provided. As seen therein the air flowing from the fans encounters the lower layer of troughs 50, passes through the gaps between the troughs, and is diffused against the bottom of the troughs above them. This diffusion pattern continues through the multiple layers of troughs so that at the top of the water collector system the air is fully diffused for uniform flow through the fill media and thus promotes uniform heat transfer. As also seen in FIG. 9, troughs 50 in each layer are laterally spaced from one another and offset relative to the troughs in the layer above or below it. The space 78 between the ends of the troughs in each layer is less than the width of the troughs themselves, thus increasing the opportunity for the troughs to collect liquid flowing down towards the fans as mist or droplets through the collector. In addition to diffusing air laterally as shown by the arrows in FIG. 9, the openings, 64 allow diffusion of the air through plates 62 along the lengths of the troughs.

In one preferred embodiment the width between the legs of a single trough 50 is about 3 inches while the spacing between the ends of adjacent legs is 2 inches.

It has been found that using five layers of troughs will collect substantially 100% of the water droplets which pass through the fill media return to the tank 34. If desired, however, more or less layers can be utilized.

Of course it is to be understood that the uniform spacing of the troughs described above is not mandatory. Indeed, depending upon the application or the specific shape of the housing, it is within the scope of the invention to vary the spacing between the troughs in order to direct air flow to specific areas. In addition, varying the size of the openings between adjacent troughs will affect the air velocity between the troughs. By varying the gap between them, air distribution can be better balanced throughout the system. However, it is important that the troughs remain overlapped, as described above, so that water cannot escape to the fans.

Figure 10:
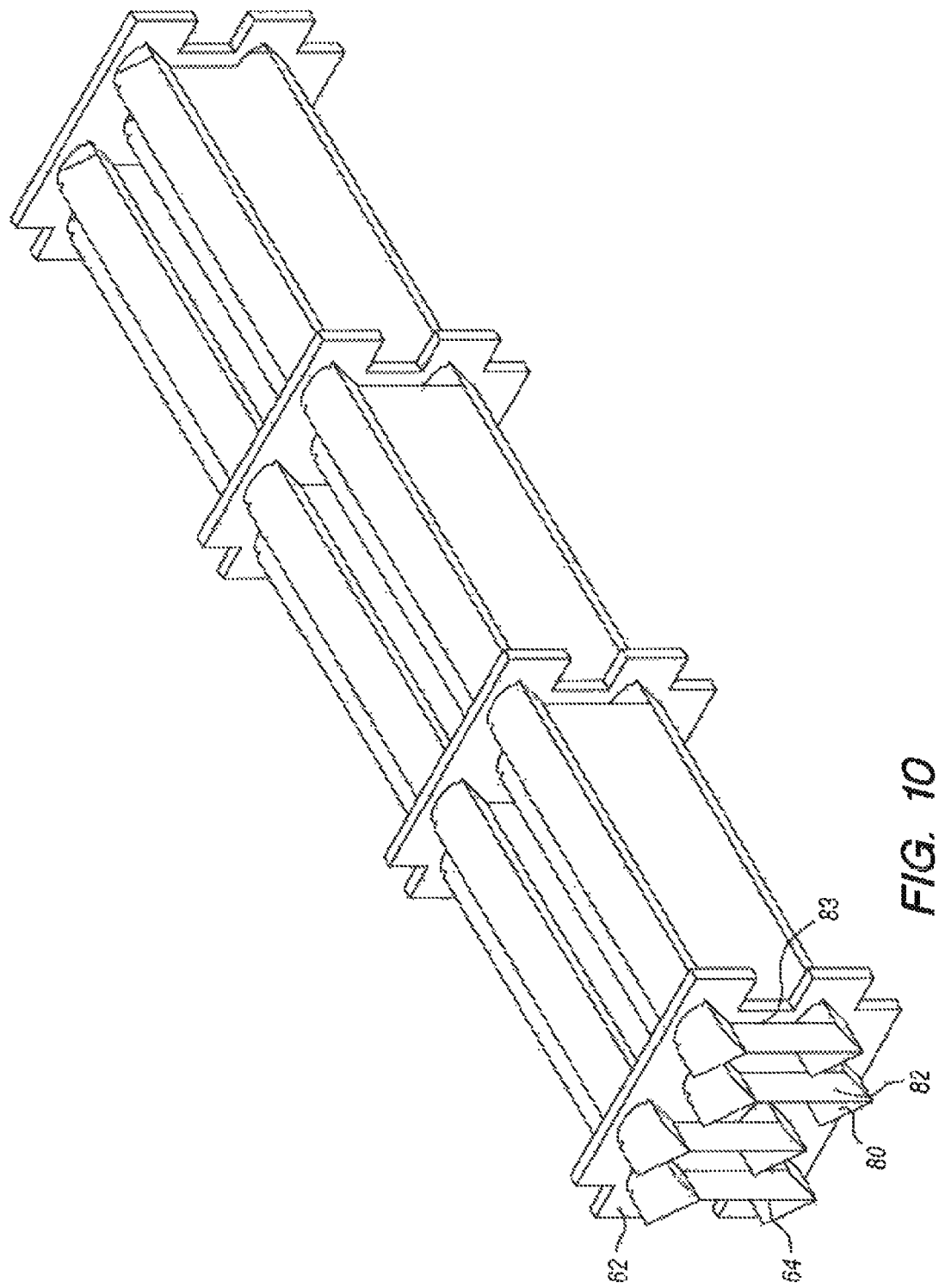
FIG. 10 is a partial perspective view similar to FIG. 6 of a section of a water collection unit according to another embodiment of the invention.
Figure 11:
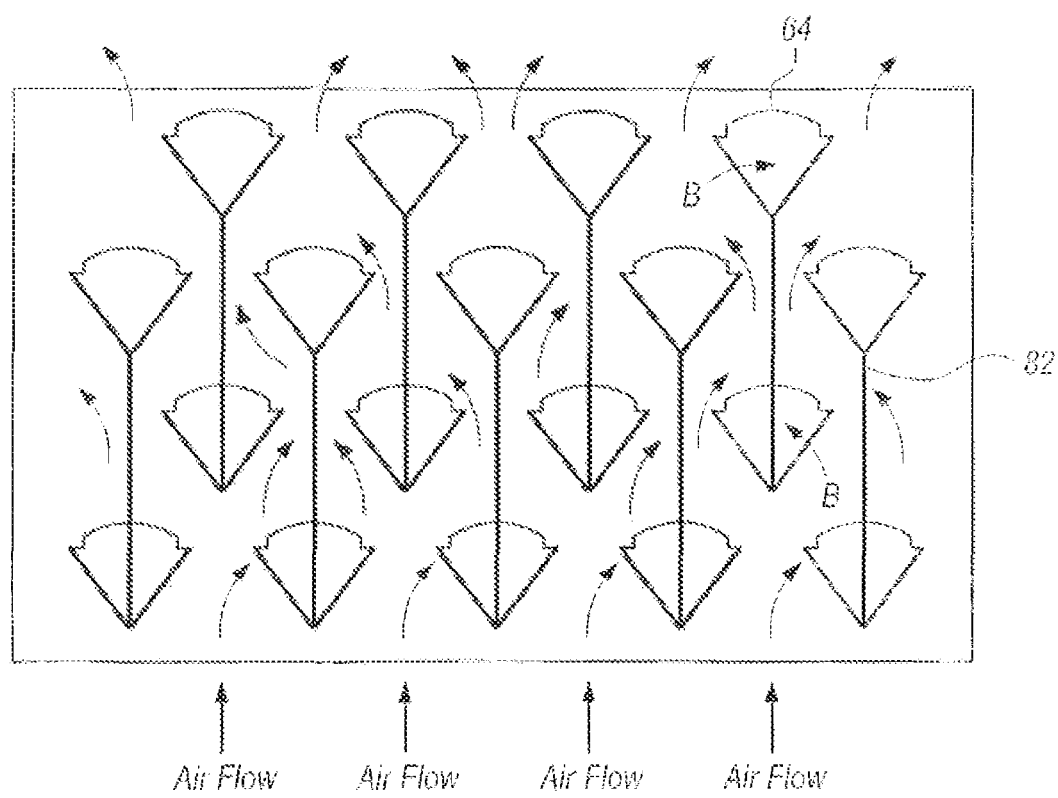
FIG. 11 is a schematic end view similar to FIG. 9 of the relationship of the troughs of the FIG. 10 embodiment to one another and the air flow paths therethrough.

FIGS. 10 and 11 illustrate schematically another embodiment of the present invention. In this case, rather than using individual troughs 50 as in the prior embodiment, pairs of troughs 80 are provided, which are connected by an integral web 82 extending vertically between their apexes. These structures would snap into openings in the support plates corresponding to the openings 64 previously described. However the plates in this embodiment would include slots 83 extending between the openings 64 to accommodate the webs 82. In FIG. 10 the plates and their openings are simply illustrated schematically. However, it may be seen how the web 82 runs along substantially the entire length of the pairs of troughs 80. By providing the troughs in pairs connected by the web 82, somewhat greater rigidity is provided to the structure.

The liquid collection system described collects all of the downcoming water, but also directs and diffuses the upflowing air so that all the fill media gets substantially equal air flow across the entire surface of the heat exchanger or fill media. This enhances more efficient air to water mixtures which increases performance of the system. In addition, the design of the water collectors provides a significant pressure drop across the collector panels, as compared to existing technology. The reduced pressure drop also increases thermal performance of the cooling tower. Moreover, the water collector system is relatively simple and economical to manufacture.

Figure 12:
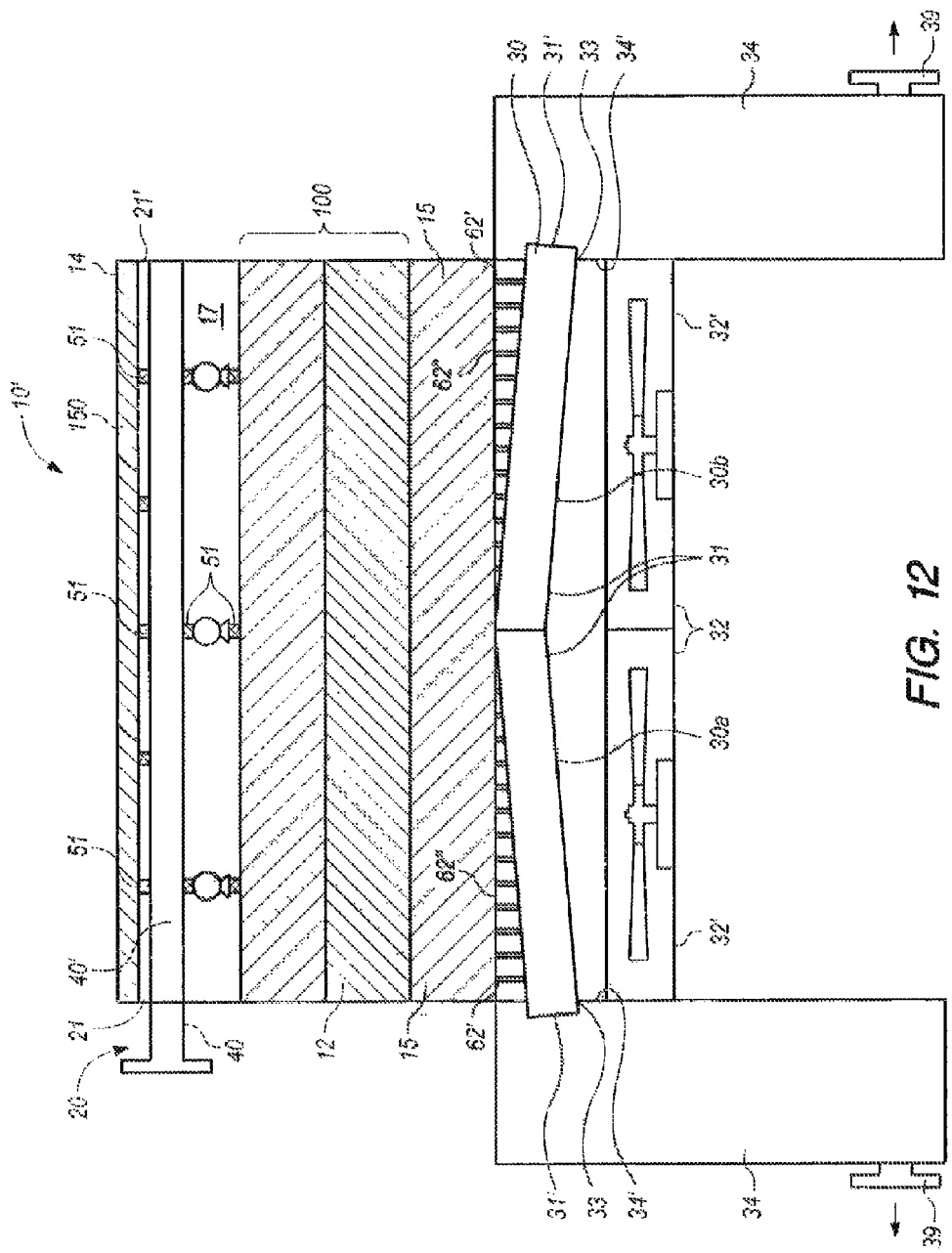
FIG. 12 is side elevational view similar to FIG. 3 of a factory assembled roof top type cooling tower constructed according to the present invention.

The water/liquid collector system as described above is suitable for small relatively portable free standing coolers or cooling towers as illustrated in FIGS. 1 and 2, which can be factory assembled and used in rooftop systems. In accordance with one embodiment of the present invention, a similar factory assemblable cooling tower is provided which eliminates the need for internal gutters. This is illustrated in FIG. 12, which uses like reference numbers for like parts shown in FIGS. 1-3. As seen therein a direct draft cooling tower 10' includes an exterior housing 12 formed of galvanized metal or the like including an open top 14 and side walls 15, 17 (one of which is removed to show the interior) and no bottom. A pair of collection tanks or water basins 34 are provided which may be separate rectangular structures secured to housing 12 in any convenient manner or side walls 15 may be elongated to form integral wall portions of the tanks. The housing contains a water distribution system 20 which supplies hot or warm water/liquid to be cooled, as for example return water from an aqueous cooling system. Passing through the inlet 40 the water is distributed from system 20 by a manifold 40' to laterally extending pipes 40" connected to nozzles 42 and from there to a bed of evaporative cooling fill media in a layer 100. A water collector unit 30 of the type shown for example in FIGS. 4-11 is mounted in housing 12 below the media for collecting water that passes through the spaces in the fill media from water distribution system 20.

As seen in FIG. 12, the water collector unit in this embodiment is formed as an inverted V shaped structure when viewed from its longitudinal side by two tilted collectors units 30a and 30b which have abutting ends 31 and opposed ends 31' which pass through and are supported in openings 33 formed in the inner walls 34' of tanks 34. The abutting ends of the troughs in the collector unit at the junction of the collector ends 31 can be opened, aligned and sealed together or closed and sealed together to prevent escape of the downwardly flowing water at junction 31. The other ends 31' are securely mounted in openings 33 in any convenient manner. The water collector unit is sufficiently rigid to be a structural means to support the walls of the enclosure, the fill media 100 and the water distribution piping 20. The collector of FIG. 11 using vertical webs 8 are appropriate for this purpose.

To support the fill media the support plates 62 of the water collector unit may have integrally formed vertical extensions 62' increasing in height from the junction of ends 31 toward the ends 31' so that their tops 62" are in level alignment. Thus the fill 100 can sit flat on the extensions without further support, likewise the water distribution system, which is in part supported by the enclosure walls 15, can rest on the fill or on resilient pads 51 placed between the top of the fill and the piping 40". Also, the drift eliminator 44 can be mounted in the open top of the housing in any convenient manner to intercept and trap mist or it can be supported on the water distribution system piping 40', 40" by similar pads 51. This arrangement eliminates the need for internal structural elements in the tower, with the collector beam providing substantially all internal support for the cooling tower's mechanical elements.

Finally, one or more fans 32 are mounted below the water collection in any convenient manner for drawing air through the open bottom of the housing and blowing it through the water collection unit and fill media counter current to the downwardly flow of that water/liquid. For example they can be mounted in frames 32' secured to the side walls of the housing. The water/liquid is thus cooled by the air and evaporation, and it is collected and flows directly into the adjacent water basins 34. The cooled water/liquid is pumped from outlets 39 to a heat exchanger or the like to cool air, or another source of heat to be cooled, before returning to the cooling towers.

If the system of FIG. 12 is used in a permanent installation, the tanks 34 can be made with sufficient vertical height so that the fans 32 can be mounted on free standing piers below the collector unit, as described below with respect to other embodiments, to improve access to the fans for cleaning and maintenance.

In accordance with a further aspect of the present invention the water collector units 30 are adapted for use in fabricating large scale cooling towers to make the operation of such towers more efficient and cost competitive with conventional large scale cooling towers. More specifically, large cooling towers are typically field fabricated from metal, wood, fiberglass and/or concrete. The latter are the most expensive.

Permanently installed cooling towers have grown progressively larger in size and typically are thirty-six to forty-eight or more feet square. In some cases they are round or rectangular in shape. In the case of concrete cooling towers horizontal structural members are required to support the internal components and outer walls of the tower. These horizontal concrete members contribute significantly to the overall cost of these structures and interfere with air flow, thereby reducing the efficiency of operations of the tower.

The water collectors described herein are adapted for use as a structural member in a modular form of concrete or other structural frameworks to improve efficiency of operation and reduce the cost of concrete towers to be competitive with stick built wood and/or fiberglass cooling towers.

FIGS. 13 to 18 illustrate a concrete cooling tower using water collector segments 110 similar to those previously described constructed to serve as a structural member of the tower. The collector segments 110 are formed of fiberglass, aluminum, stainless steel or other structural material using a plurality of vertical webs (similar to the embodiment of FIG. 10) or support members 112, that are, for example, eighteen inches high. In this embodiment the webs 112 extend the full height of the collector unit from its bottom edge 113 to its top edge 131' and provide substantially vertical structural webbing. The webbing is substantially vertical in the sense that it varies less than 30°, 20°, or 10° from the true vertical. The webs 112 have water collection troughs 114, 116 and 117 secured thereto (See FIG. 17). This embodiment does not have (but could have) transverse support panels 62 similar to those shown in FIG. 10. The absence of the support panels allows not only the lateral distribution of air by the troughs but also along the length of the webs as well. In addition the webs 112 intercept liquid spray or mist moving laterally between them in the beam and guides that liquid to the trough below.

Figure 13:
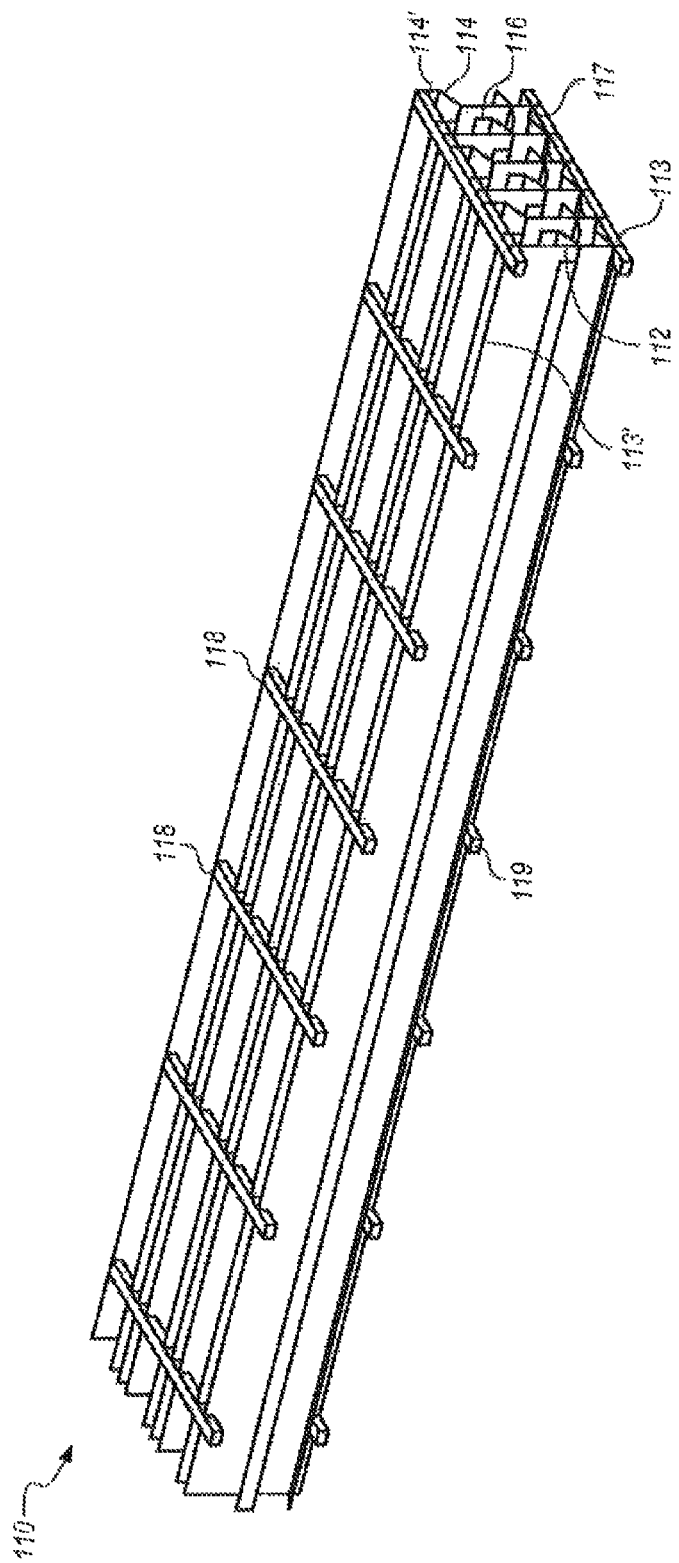
FIG. 13 is a perspective view of a section of a water collector unit similar to those shown in FIGS. 1-12 but formed to serve as a part of a water collector unit used as a structural member of a large scale cooling tower.
Figure 16:
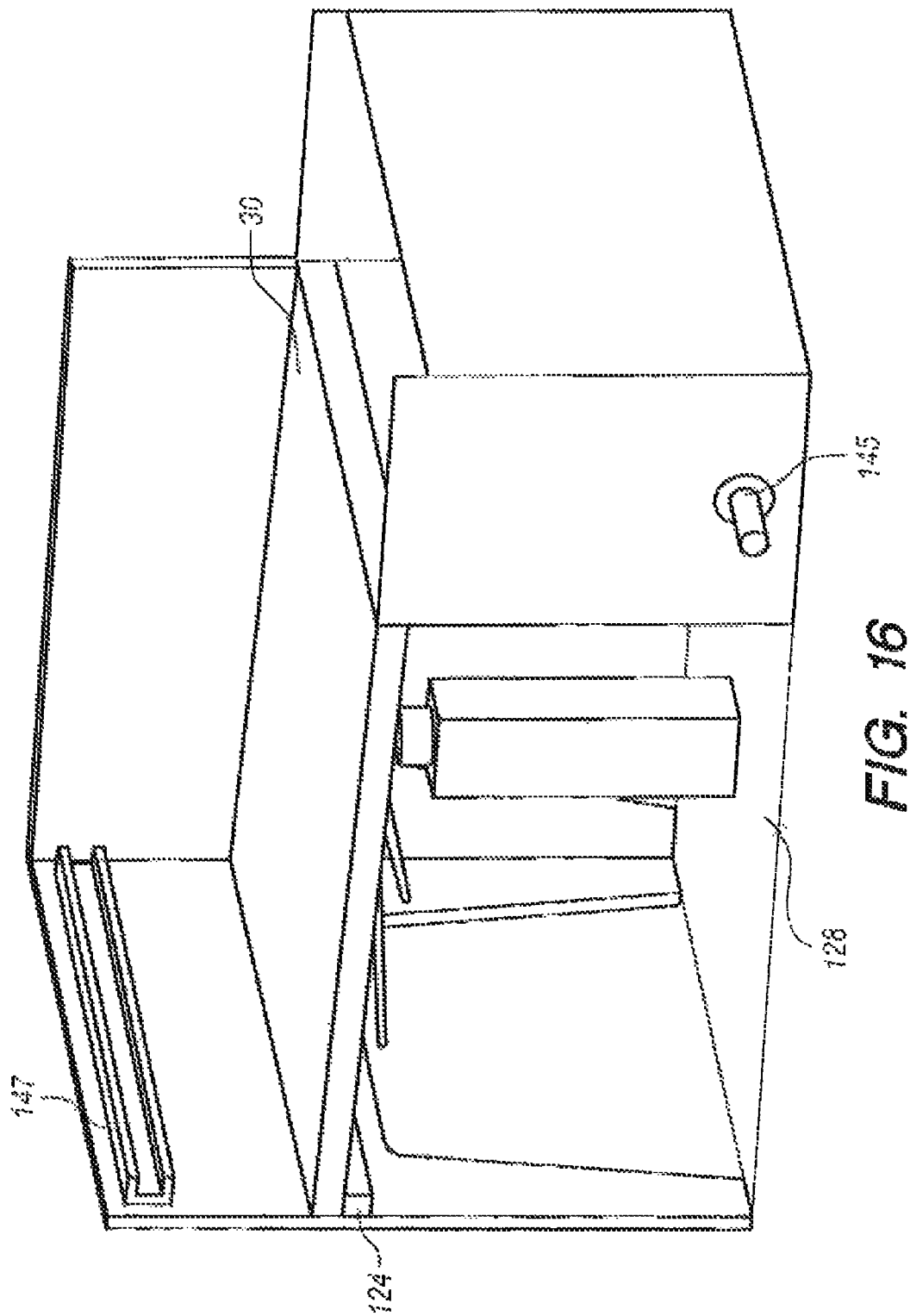
FIG. 16 is a perspective view of the housing of the cooling tower of FIG. 14, with the water collector unit/system installed as a structural member for the tower.

As illustrated in FIG. 13 six such webs 112 and the top edges 114' of troughs 114 are secured together by substantially horizontal upper and lower cross bracing 118, 119 to form a collector unit section 110 that also is capable of withstanding structural loads as a beam or truss. The cross braces 118, 119 may be formed as tubular U or V shaped bars having slots 118a and 119a formed therein to slide over upper and lower the edges of the vertical webs 112 and the top edges 114' of the troughs 114, thereby extending from the troughs to an adjacent web segment. They may or may not be spot welded in place as necessary. The cross braces are substantially horizontal in the sense that they vary less than 30°, 20°, or 10° from the true horizontal. Adjacent collector sections 110 may be secured together by the cross bracing members 118, 119, spanning between two adjacent sections to form the complete water collector unit/system 30 forming a structural beam 30 (FIG. 16). This is seen in FIG. 13 wherein the cross bracing is shown extending entirely past the last web to engage the adjacent web of an adjacent collector section (not shown). Additional cross braces between collector sections may be used as well.

Figure 14:
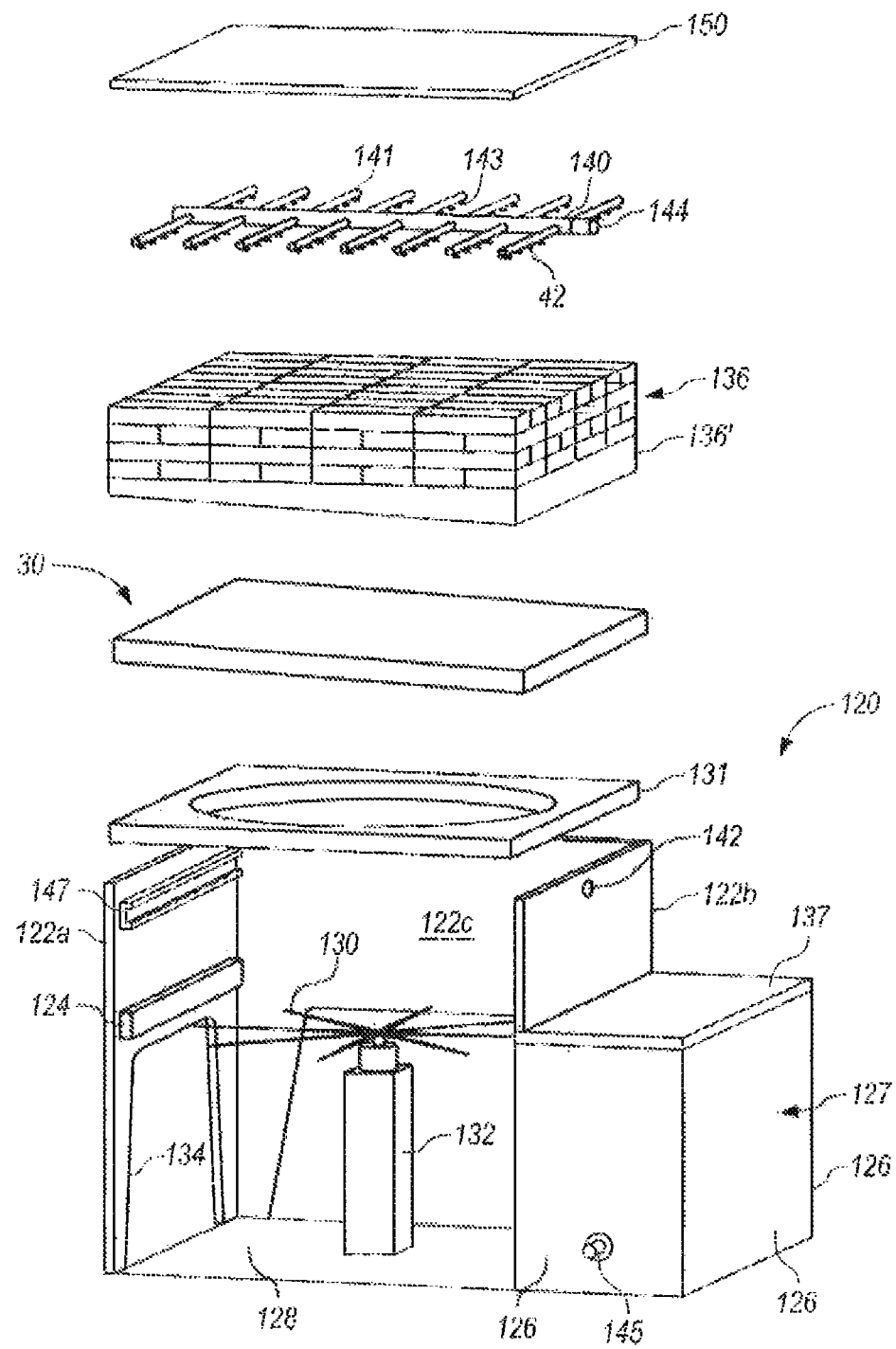
FIG. 14 is an exploded perspective view of a concrete cooling tower according to the present invention.
Figure 15:
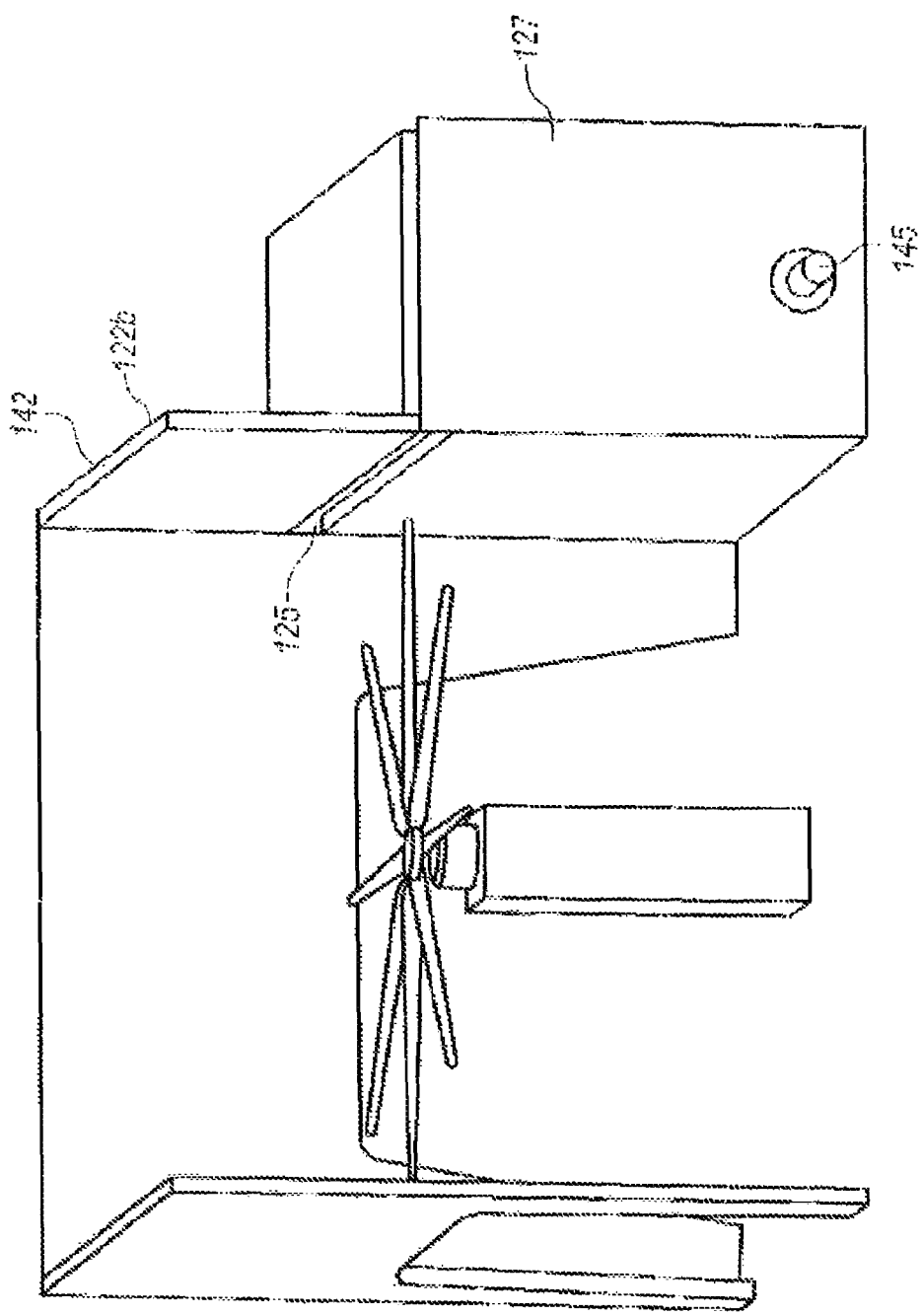
FIG. 15 is a perspective view of the housing of the cooling tower of FIG. 14, with one wall removed and the fan installed.
Figure 17:
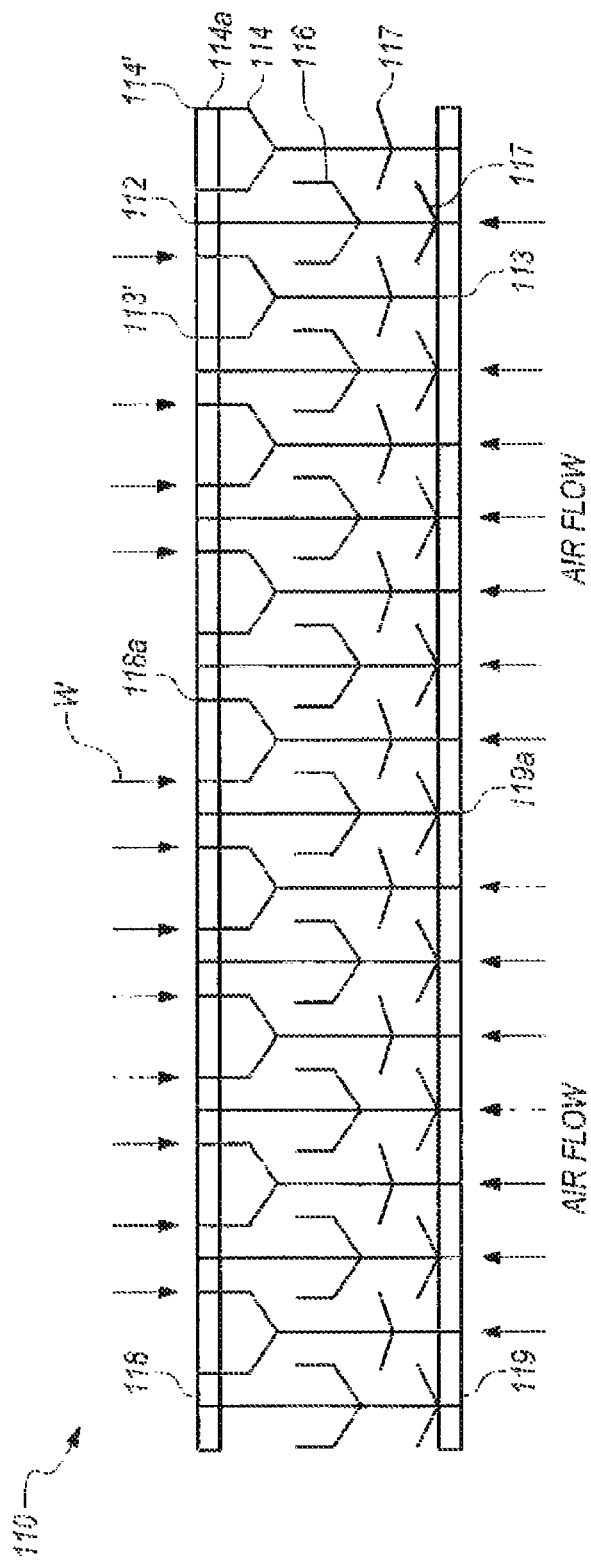
FIG. 17 is an end view of a portion of the water collector unit/structural member of FIG. 16.

As seen most clearly in FIG. 17, the upper troughs 114, in the direction of air flow have substantially vertical sides 114a secured at their top edges to the upper cross braces 118 and the webs terminate at the bottom of the troughs 114. The middle troughs 116 also have substantially vertical side walls 116a, unsecured to the braces, but have the webs extending through the troughs. The upper troughs 114, 116 are designed to collect down coming water flow W exiting the cooling tower fill media 136 (FIG. 14). The lower troughs 117 are simply V or U shaped with sidewalls that extend outward at angles of at least 30° from the vertical. The lower troughs 117 function to collect and contain any spray or air borne water droplets attempting to escape the water collection system.

The use of the collector unit/beam as a structural member enables the construction of a modular cooling tower consisting simply of four exterior walls and an attached reservoir or collection tank by prefabrication or building at the site. One such system is shown in FIGS. 14-16 and 18. As seen therein cooling tower 120 includes simply four exterior walls 122, one of which is removed in FIG. 14 to allow a view of the interior. Two opposed vertical walls 122a and 122b are used to support the ends of the collector 30. Wall 122a has a support shelf or ledge 124 formed in it while wall 122b has a slot 125 formed in it (See FIG. 15) in which the other end of the water collector unit/beam 30 is mounted. The collector beam spans substantially the entire length of the structure between walls 122a and 122b and its entire width between the rear wall 122a and the removed front wall. The ends of the beam are secured in any convenient manner on the shelf 124 and in the opening or slot 125. This forms a structural beam supporting walls 122a and 122b, the other walls connected to them and all of the mechanical equipment in the tower.

In addition to the side walls, three further walls 126 are provided adjacent to wall 122b to form a watertight reservoir or tank 127 adjacent the tower. These walls are sealed together and to the foundation 128 in any convenient and known manner.

The walls of cooling tower 120 can be prefabricated from panels of poured concrete and shipped to the site for assembly or they can be poured in place. Alternatively the walls and tank can be formed of concrete blocks, for the beneficial reasons discussed above. The collector beam 30 mounted as described above forms a large structural beam which eliminates the need for any other horizontal or vertical structural or support members within the tower. As an example, a suitable support free modular tower can be 24 feet square.

In addition to the water collector beam 30, the tower will house an air fan 130 mounted on a concrete or metal pedestal support 132. The fan operates to draw cool ambient intake air through the large openings 134 in three of the side walls.

Typically cooling tower fans are mounted within the tower above the drift eliminator. This requires entering the interior of the tower to service the fan. Because cooling towers serve potentially hazardous products that can enter the tower, entering the confined spaces in the tower may not be permitted under present day health and occupational codes. Mounting the fan or fans on pedestals below the collector beam eliminates the cumbersome and expensive structural members previously required to support the heavy loads of top mounted fans used in conventional large cooling towers. The bottom mounted fan at ground level also can be serviced and maintained without entering the tower box.

Figure 18:
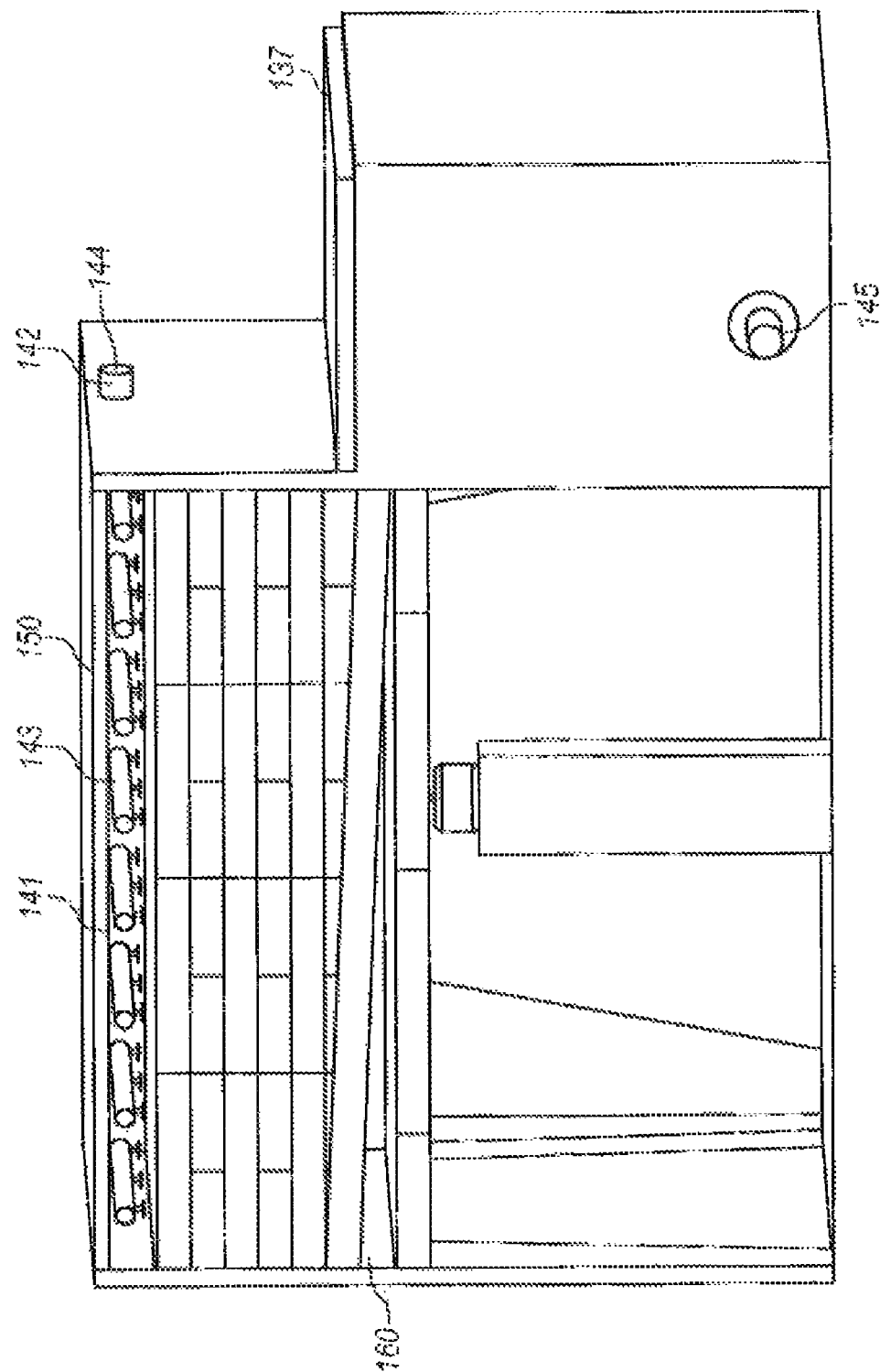
FIG. 18 is a perspective view of the cooling tower of FIG. 14 with the water collector unit, fill media, water distribution system and drift eliminator installed.
Figure 19:
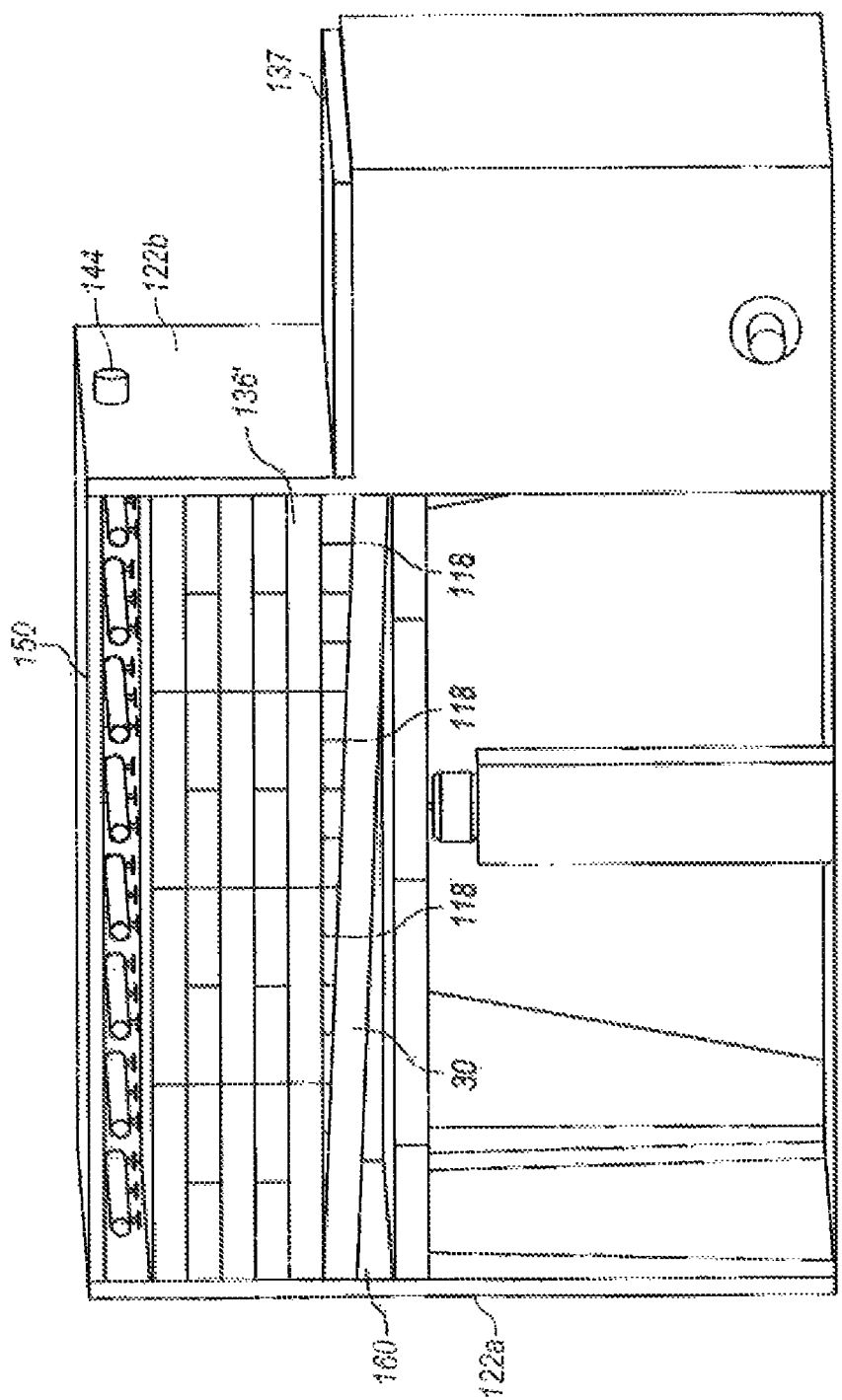
FIG. 19 is a view similar to FIG. 18 but illustrating how the water collector unit/structural member is formed to support fill media having a flat horizontal bottom.

A conventional fan shroud 131 is suspended in any convenient manner from the walls 122. The traditional layers of evaporating fill media 136 are simply installed on top of water collector beam 30 and supported by it. The water collector beam is preferably mounted so that the end supported in the wall 122b adjacent the water tank is lower (e.g. by 4 or 5 inches or so) than the other end so the water captured by the troughs flows toward the end of the beam seated in slot 125 in wall 122b to flow into the tank. (See FIG. 16.) In one embodiment the lower layer 136' of fill media 136 is tapered, as shown in FIGS. 14 and 18, to accommodate the inclination of the beam 30 and rests directly on the collector or on resilient pads 51 (not shown) between the bottom of the fill and the braces 118. Alternatively as shown in FIG. 19 the braces 118 on the top surface of the beam sections 110 of beam 30 can have varying heights increasing from the end mounted on wall 122a to the end mounted in wall 122b so their top edges define a horizontal plane. In that case the bottom of the lower layer 136' of the fill media need not be tapered.

Previously proposed water collector systems have all used collectors installed in a level position in the unit under the fill. As a result they respond like a sediment basin as mud and other sediments build up in the troughs. The tilted collectors of the present invention enables the troughs to collect more of the water volume and creates water velocity in the troughs that keep them clean of mud and debris.

In addition, conventional cooling towers all have louvered air or access openings. Prevailing winds and water splash out of the tower through the louvers and can cause contamination of adjacent piping and equipment outside the tower necessitating expensive maintenance and repairs. The present invention eliminates the need for such air or access openings as the water collection system provides a means for incoming air to enter the tower. Also, because the water from the collector beam flows directly from the cooling tower housing into the water basin 127, should the troughs ever require cleaning they are accessible through the water basin. This is contrasted with prior art water collection systems which have to be removed to be cleaned and serviced.

The top of the tank is preferably closed by a cover 137 in any convenient manner. Although the tank could be open if desired, a cover is preferred as it prevents air escaping from the tower at the water exits 125.

A water distribution system 140 similar to that previously described above is used in the tower 120 and is mounted therein above the fill. It has a manifold 141 supported in a port 142 formed in wall 122b, and in a similar port (not seen in FIG. 14) at its opposite end in wall 122a and by the top surface of the fill. The distribution system includes laterally extending pipes 143 extending from manifold 141 connected to nozzles 42. Resistant support pads 51 (not shown) can be placed between the piping and the top of the fill to transfer weight through the fill to the beam 30.

Figure 20:
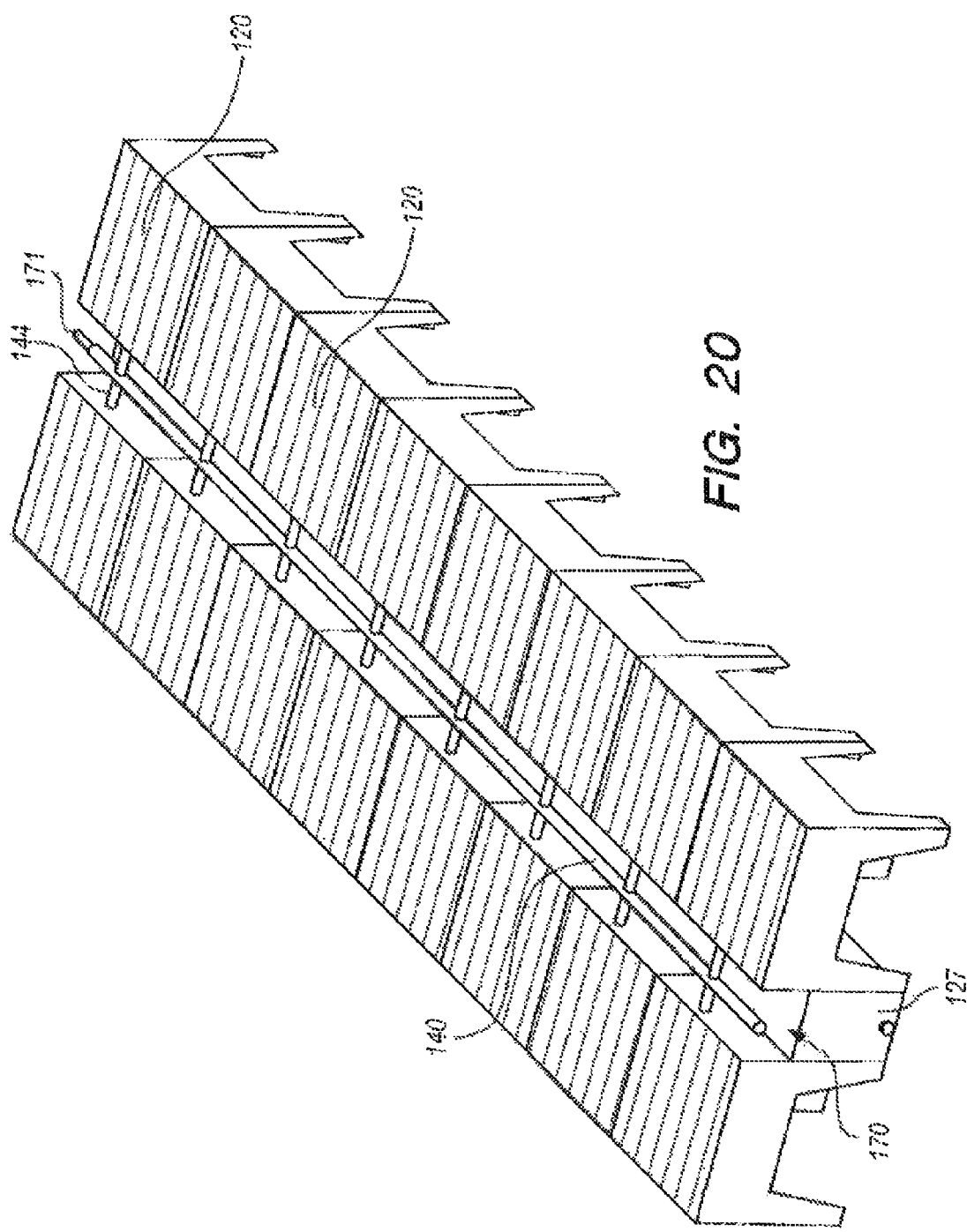
FIG. 20 is a schematic view of multiple cooling tower units as shown in FIG. 14 connected together.

The water supply inlet end 144 is connected to the supply water system 170 (see FIG. 20). As with the previously described embodiment the cooled liquid collected in the reservoir or tank 127 is pumped out of the tank through a discharge opening 145 by a pump (not shown) for supply to a heat exchanger (not shown) for cooling air or other source of heat requiring cooling. The then heated liquid is pumped back to the distribution system 140 at inlet 144 in the cooling tower for recooling.

Lastly, a conventional drift eliminator structure 150 is mounted in the open top of the tower and can be supported directly on top of the water supply system 140 (See FIG. 18), using resilient pads 51 between the top of the piping and the undersurface of mist eliminator. In addition C shaped seals 147 (FIGS. 14, 16) may be mounted on the inner surfaces of the cooling tower walls at the top for receiving the edges of the mist eliminator and form an air seal along the wall to force all exiting air through the mist eliminator.

As will be appreciated the water collection beam 30 performs several vital functions. It collects all the down flowing water exiting from the tower fill media and channels it into the adjacent vertical water reservoir. An air passage area 160 (FIG. 18) is provided beneath the water collector beam and above the fan that allows the up flowing air to be delivered uniformly from the fan positioned below it.

The water collection beam also provides the base support structure for the fill media, the water distribution piping and the drift eliminators. This allows the tower components to simply be nested in place while supported by the water collection system/beam.

The present invention conveniently allows use of bottom mounted fans in a water free area which extends the life of the fans and any attendant gear boxes. Not only does this also eliminate the need for horizontal fan support structures, as previously noted, but it further eliminates safety and health issues in servicing the mechanical equipment inside a wet slimy cooling tower box.

The enclosed water reservoir keeps sunlight, sand and other debris from entering the water. Also, because it is vertical rather than beneath the fan, the water basin allows use of horizontal rather than vertical piping, which can be above ground. In addition water level in the basin can be maintained near the discharge level of the collector thereby providing a column or head of water above grade which reduces the tower pump head requirements to recirculate the liquid from the reservoir to the higher inlet of the water distribution system.

Finally FIG. 20 illustrates a plurality of individual cooling towers 120 coupled together to form a very high capacity system. As seen therein, each pair of towers 120 share a reservoir 127. The water collectors in opposed towers are tilted towards the common reservoir. The water supply system 170 supplies the returning heated liquid to the water/liquid distribution system 140 through a common manifold 171 connected to the reservoirs (which are also connected together) through the water pumping system (not shown).

FIGS. 21-28 illustrate other embodiments of the invention wherein the water collector beam 30 described above is used in a prefabricated large enclosure such as a conventional cargo container.

Figure 21:
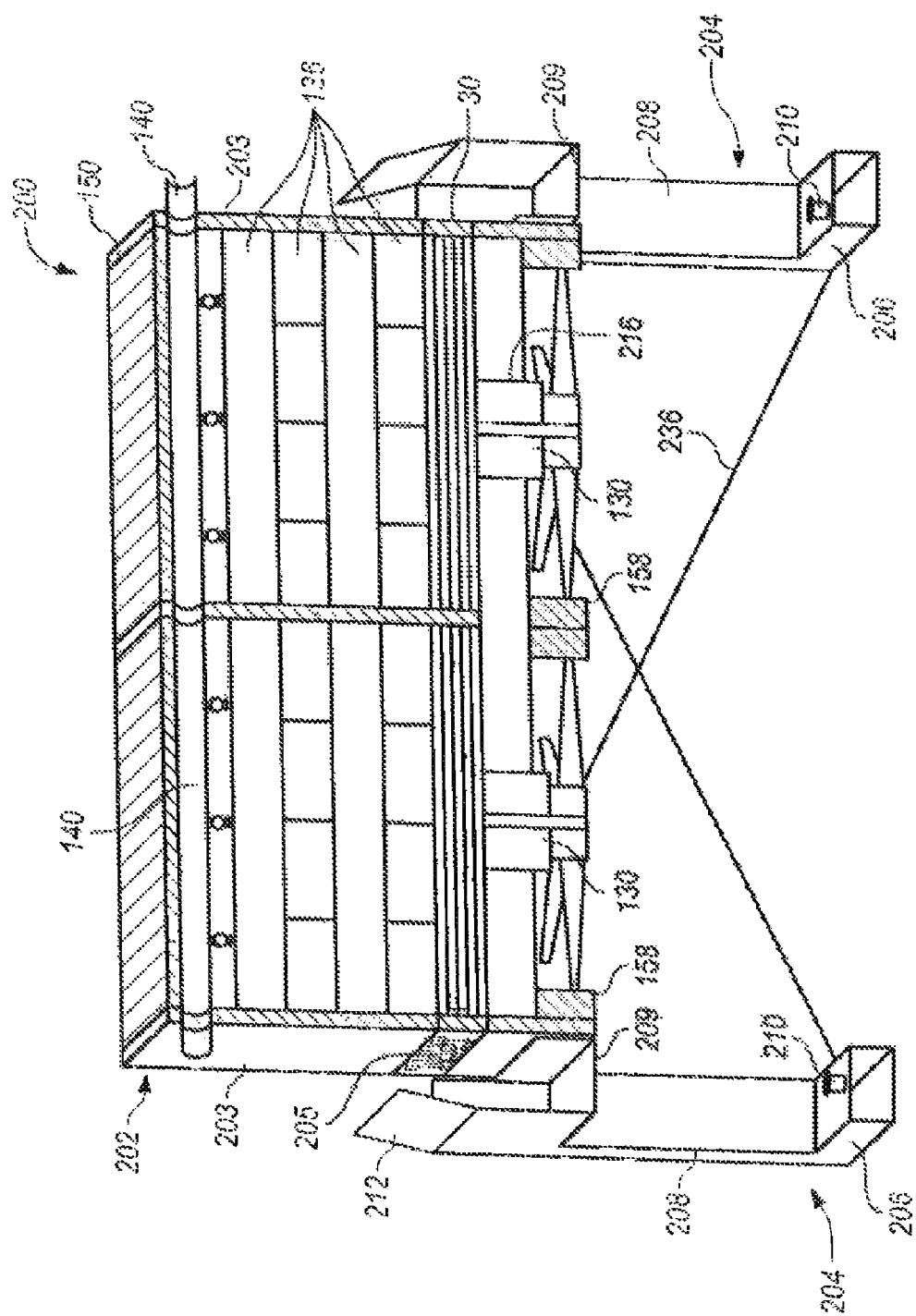
FIG. 21 is a view in longitudinal cross section of a large scale cooling tower according to the present invention constructed using a cargo container.

In the embodiments of FIGS. 21-28 a cooling tower 200 is formed using a conventional cargo container 202 shown in longitudinal cross section in FIG. 21. The container 202 has no top or bottom. As in the prior embodiments of FIGS. 1 and 12, cooling tower 200 includes one or more bottom mounted fans 130, a water collection system beam 30, layers of evaporative fill media 136, a water distribution system 140, and a layer of mist eliminator 150. Existing or newly constructed cargo containers can be used, with a cooling tower being retrofitted into an existing container.

The use of the bottom mounted fan in a cooling tower requires that the operating equipment be elevated above grade to allow air to enter the fan and the tower or tower modules. This, of course, requires substructure to support the elevated equipment.

In this embodiment the substructure is provided by two vertical water basins or reservoirs 204 to support the tower module provided in the cargo container at an above grade level.

Each water basin 204 includes a hollow support base member 206 connected to hollow vertical legs 208 which in turn are connected to an open topped channel 209 connecting the upper ends of legs 208 of the water basin or tank 204. A pivotably mounted cover 212 is provided on the basins 204 to protect liquid therein when in use.

Figure 23:
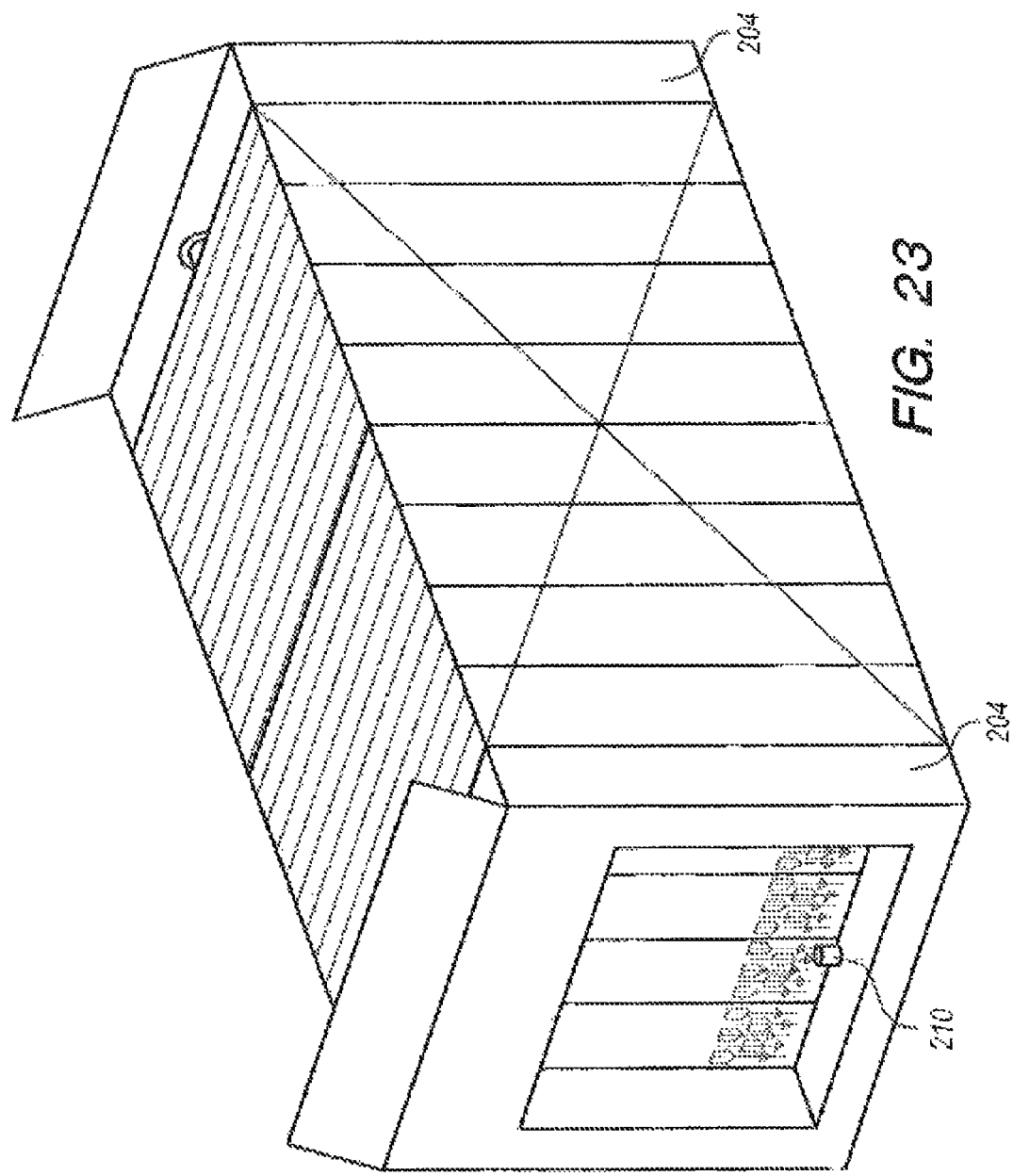
FIG. 23 is a perspective view of the cooling tower of FIG. 21 with its support water basins or tanks retracted.
Figure 24:
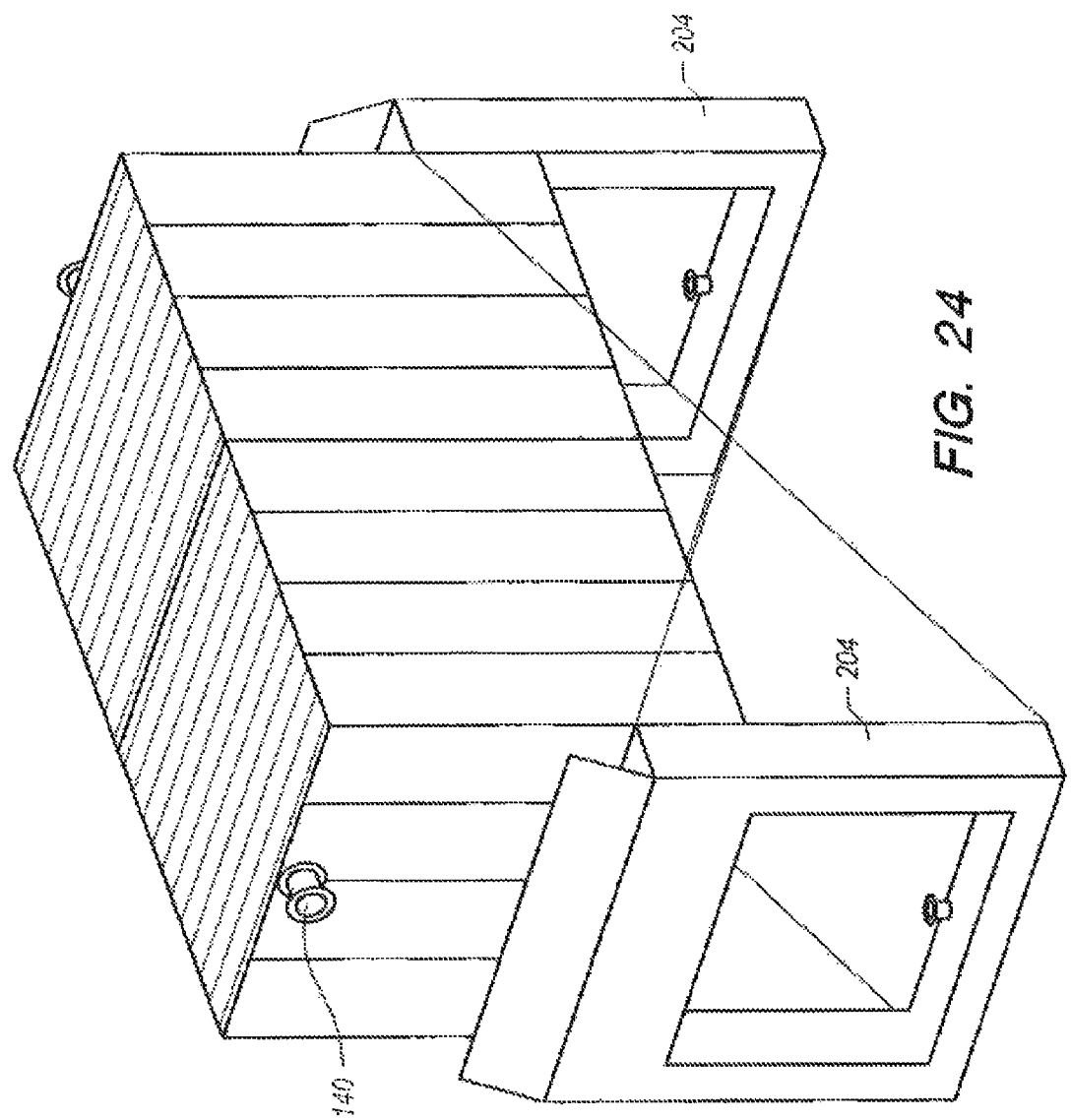
FIG. 24 is a perspective view of the cooling tower of FIG. 21 with the support water basins or tanks extended.

Water basins 204 are mounted on the end walls 203 of the cargo container for movement between extended and retracted positions, shown respectively in FIGS. 23 and 24. In the extended position shown in FIGS. 21 and 24 the tanks 204 are positioned to receive water from the water collector beam 30.

The water collector beam 30 is positioned in the bottom of the portion of the cargo container. The ends of the water collecting troughs extend through holes 205 formed in the end walls 203 of the container, which are generally complementary to and receive the ends of the troughs in the beam as most clearly seen in FIG. 23. The collector beam serves as a structural member providing rigidity to the cargo container and support for the equipment therein. It is joined to the container walls in any convenient manner, e.g., by spot welding.

Figure 22:
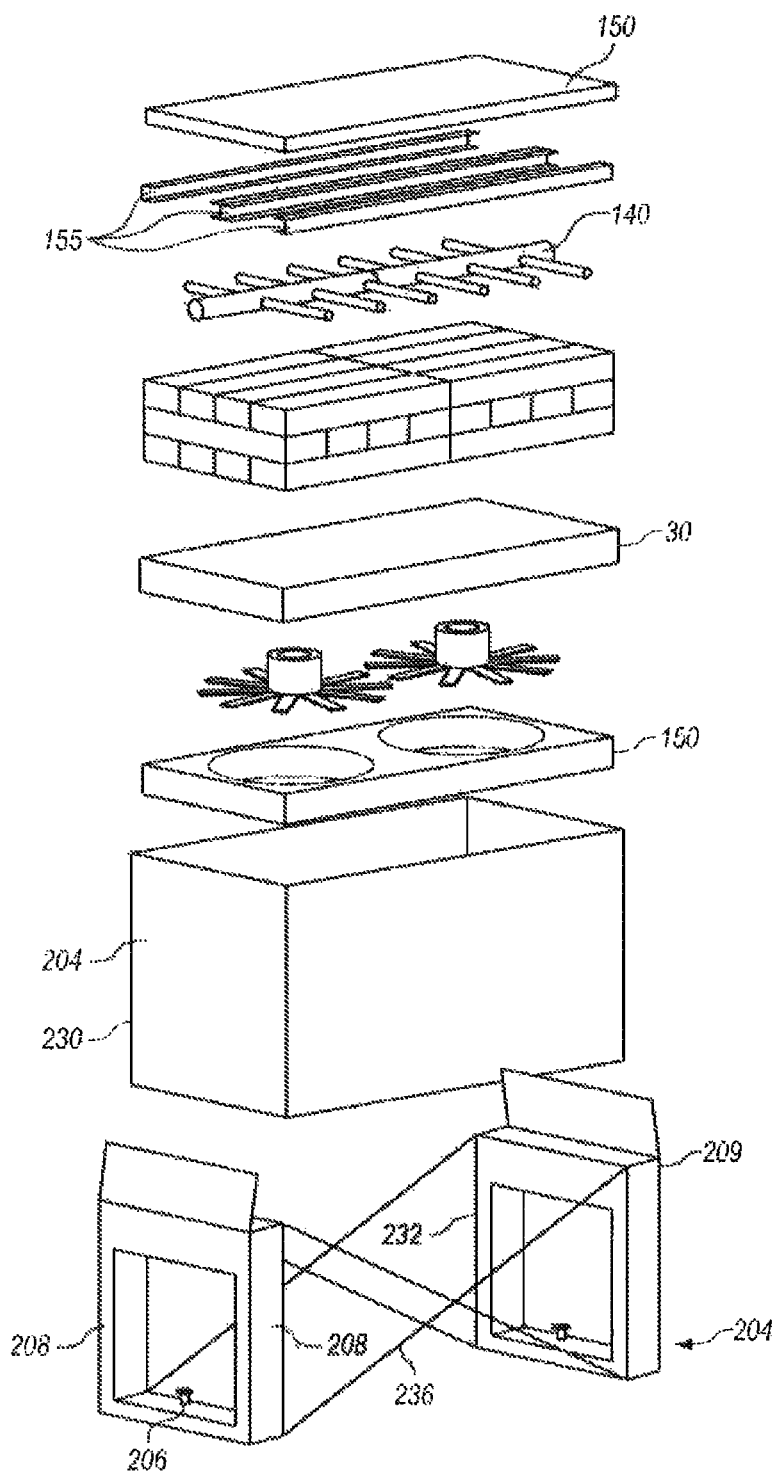
FIG. 22 is an exploded perspective view of the cooling tower of FIG. 21.

As seen in FIGS. 21 and 22, the water collecting system/beam 30 is positioned below the fill media and above the bottom mounted fans. The water collection system allows passage of up-flowing air delivered from the bottom mounted fans into the fill media and then exit past the water distribution system 140 through the mist eliminator 150. In the illustrative embodiment the beams 30 are horizontal, as in the embodiment of FIG. 3, and directly supports the fill media 136. Alternatively the beam may be an inverted V shape with the two halves tilted in opposite directions in accordance with the embodiment of FIG. 12, in which case the transverse support braces of the beams are incrementally extended vertically as described with respect to the embodiment of FIG. 19 to support the fill media. In addition the water distribution system 140 is supported on the fill by resilient pads 51 (not shown) as previously described. And, the mist eliminator 150 is supported on the water distribution system by resilient keeper pads 155.

As described above, the water collection system also serves to collect, contain and direct all the down-coming water exiting the fill media, which in this case is directed by the collection troughs into the top channels 209 of the reservoirs 204 from which it is circulated through outlets 210 to a heat exchanger to cool a source of heat and returned to the water distribution system 140. The advantages of such vertically enclosed water basins as described above are also seen in these embodiments.

Due to shipping height restrictions, it is desirable to minimize the height and width of heavy equipment for shipping. Heretofore typical cooling towers were shipped in sections and had to be assembled on site. If they were shipped as unitized structures, over-height or width permits were required.

The present invention provides a shipment module for a complete cooling tower that is within shipping specification of most trucks and the width and height requirements of ocean going shipping containers (i.e., 8 feet 5 inches in height and 7 feet 8 inches in width). Of course the invention is not limited to those dimensions as equipment module sizes for domestic transportation can vary in accordance with shipping restraints of local trucking requirements. And, if desired, larger modules can be used but may require oversized permits.

In the present invention the height requirement is addressed by eliminating the air plenum 160 and mounting the fans 130 with their electric motors vertically directly beneath the water collector 30.

The fans 130 are positioned such that the blades do not protrude below the bottom edge of the cargo container. A conventional fan shroud 158 is placed around the fan blades and mounted on the cargo container walls and then water collector 30 is connected to the shroud. With this arrangement the water collection system collects all of the water exiting the fill media while also acting as an air diffuser and plenum chamber.

The water reservoirs 204 are secured to the cargo container for relative sliding movement. For example, the container and reservoir can be provided with complementary male and female tracks 230, 232 which prevent horizontal movement but allow vertical movement. Conventional latching systems (e.g., pin in hole latches) can be used to latch the basins and cargo containers in fixed extended or retracted positions, and when unlatched allow the desired relative vertical movement between positions. The movement itself is intended to be powered by an external device such as a crane. Alternatively an internal drive train can be provided.

In addition cross bracing 236 may be provided to add stability to the reservoirs in the extended positions.

Figure 25:
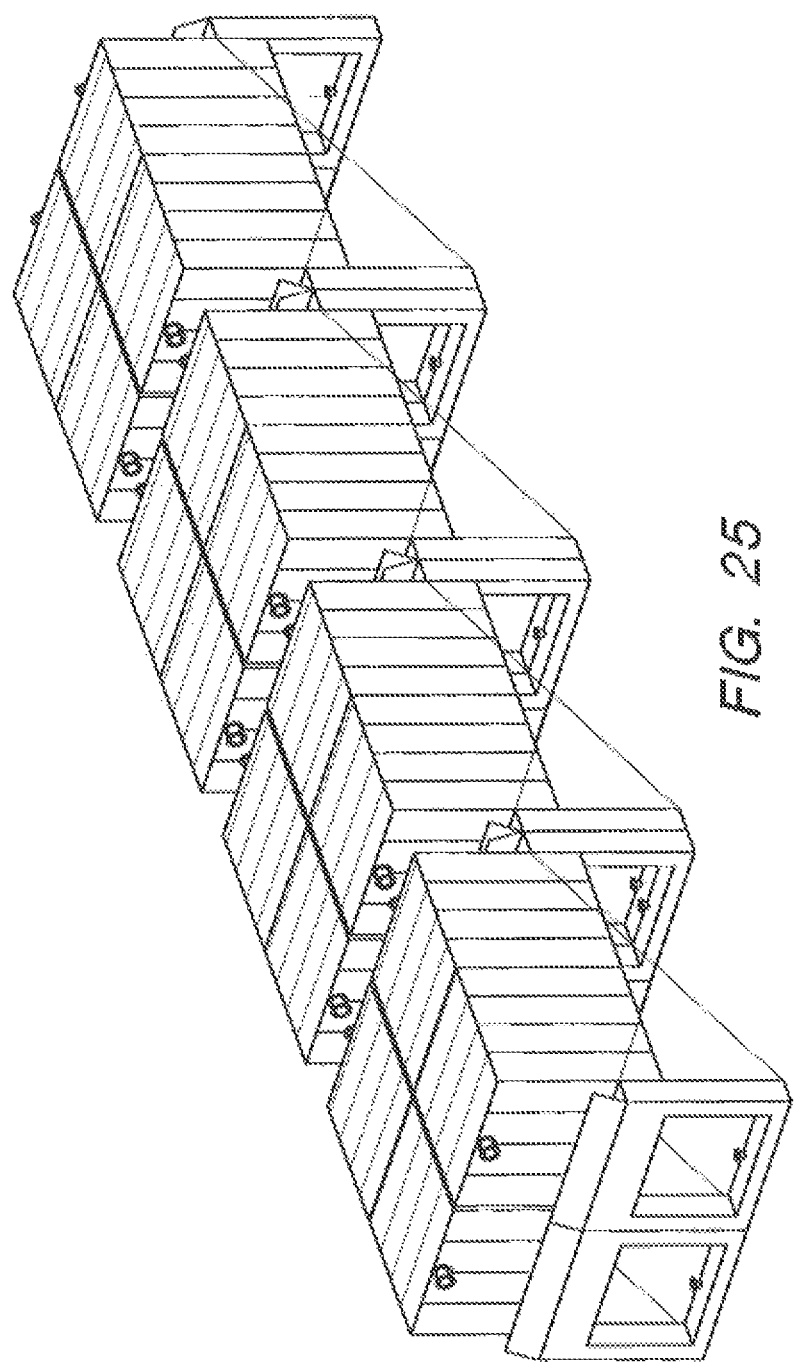
FIG. 25 is a perspective view of multiple cooling towers formed according to FIGS. 21-24 connected together.
Figure 26:
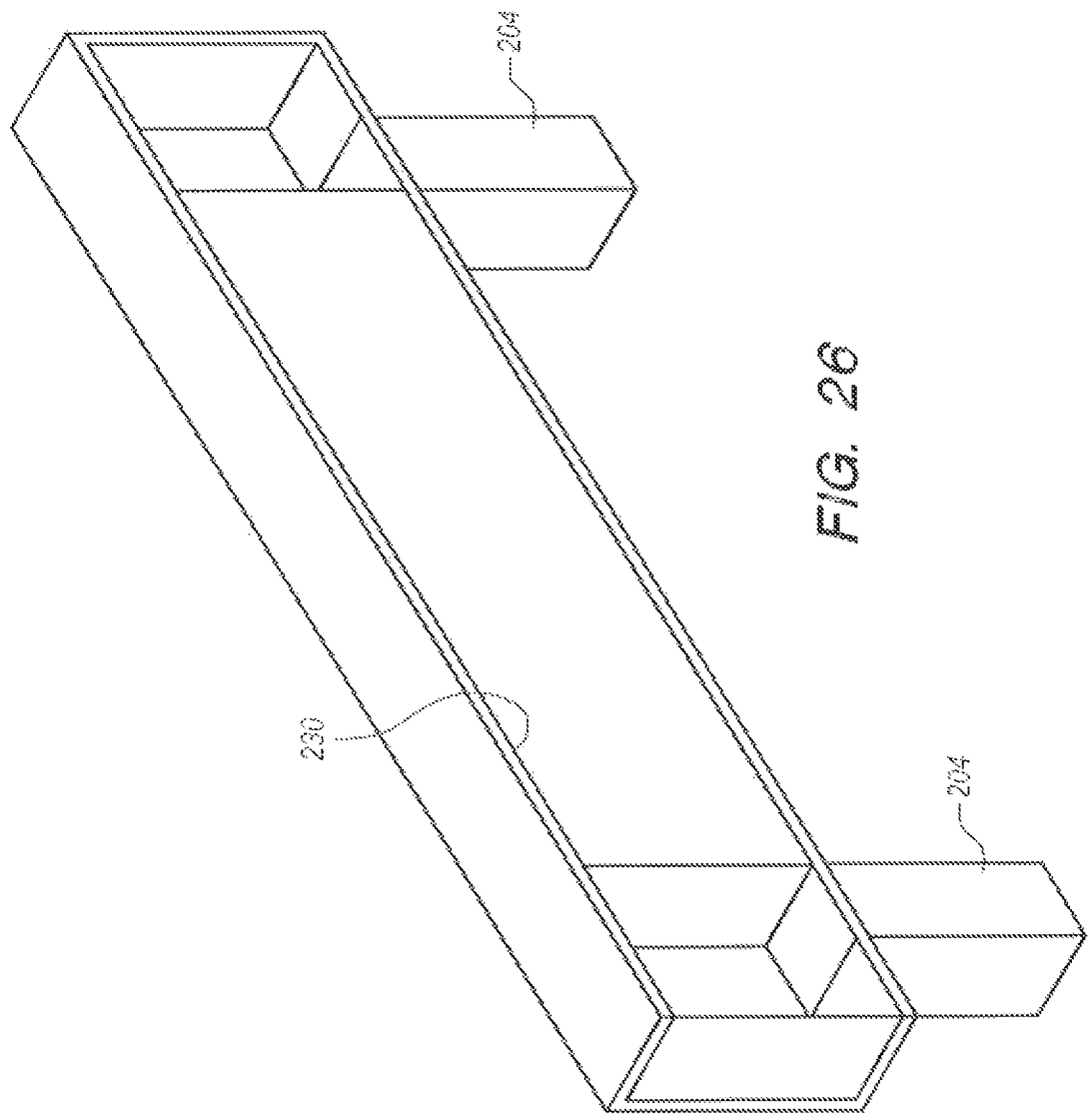
FIG. 26 is a schematic perspective view in longitudinal cross section of another embodiment of a cargo container based cooling tower with internal water tanks or basins shown in their extended position.
Figure 27:
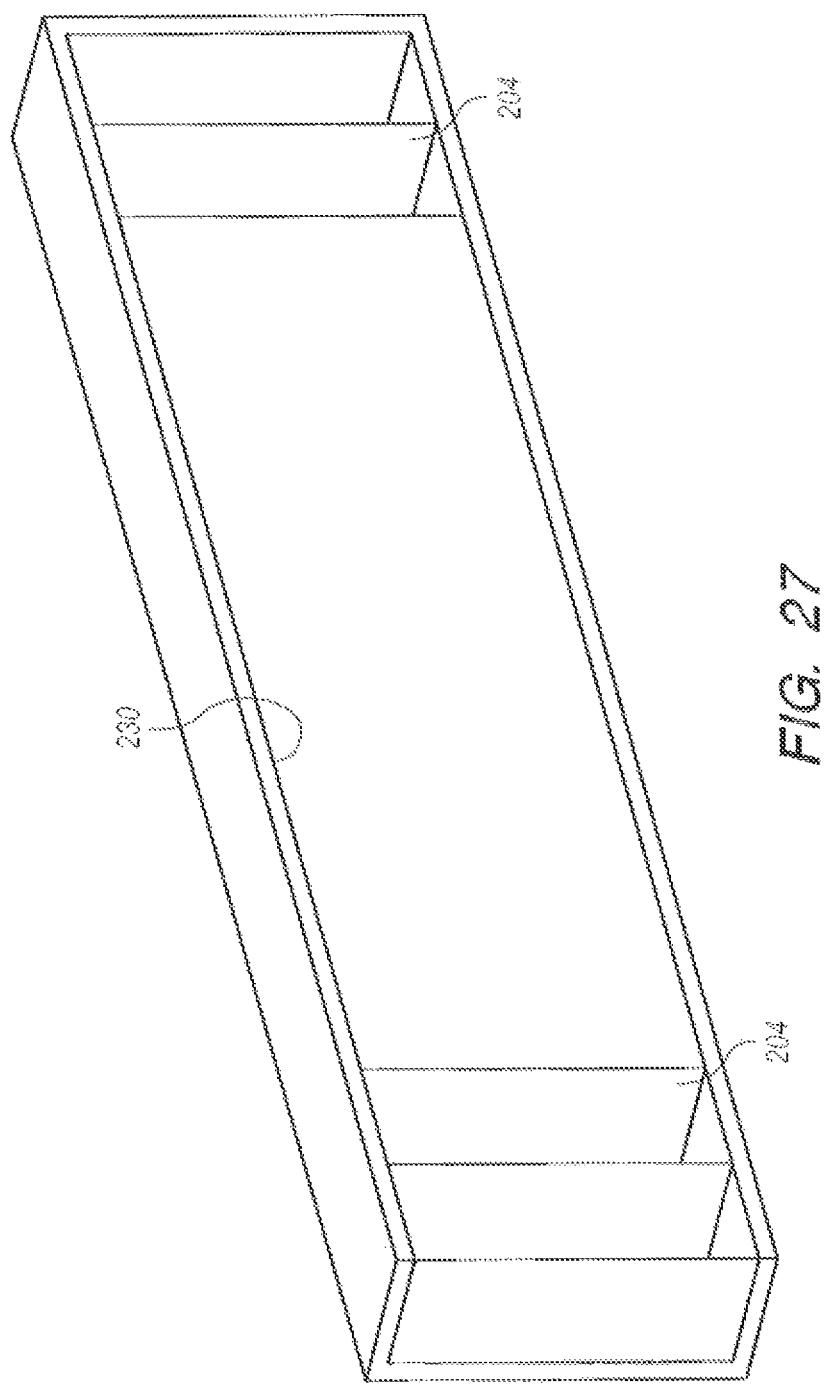
FIG. 27 is a view similar to FIG. 26 with the water tanks or basins retracted.
Figure 28:
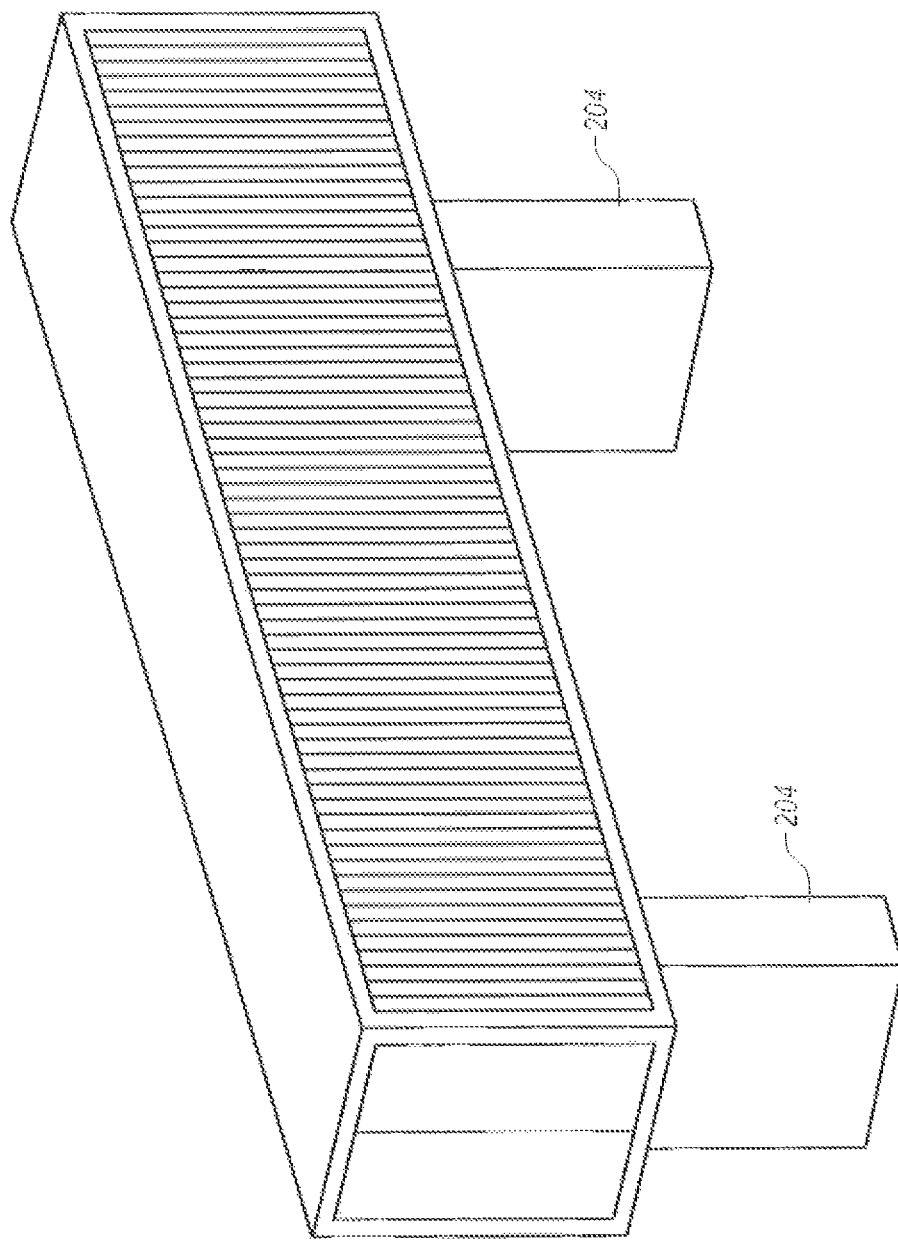
FIG. 28 is a full perspective view of the cooling tower of FIG. 26 with the water tanks or basins extended.
Figure 29:
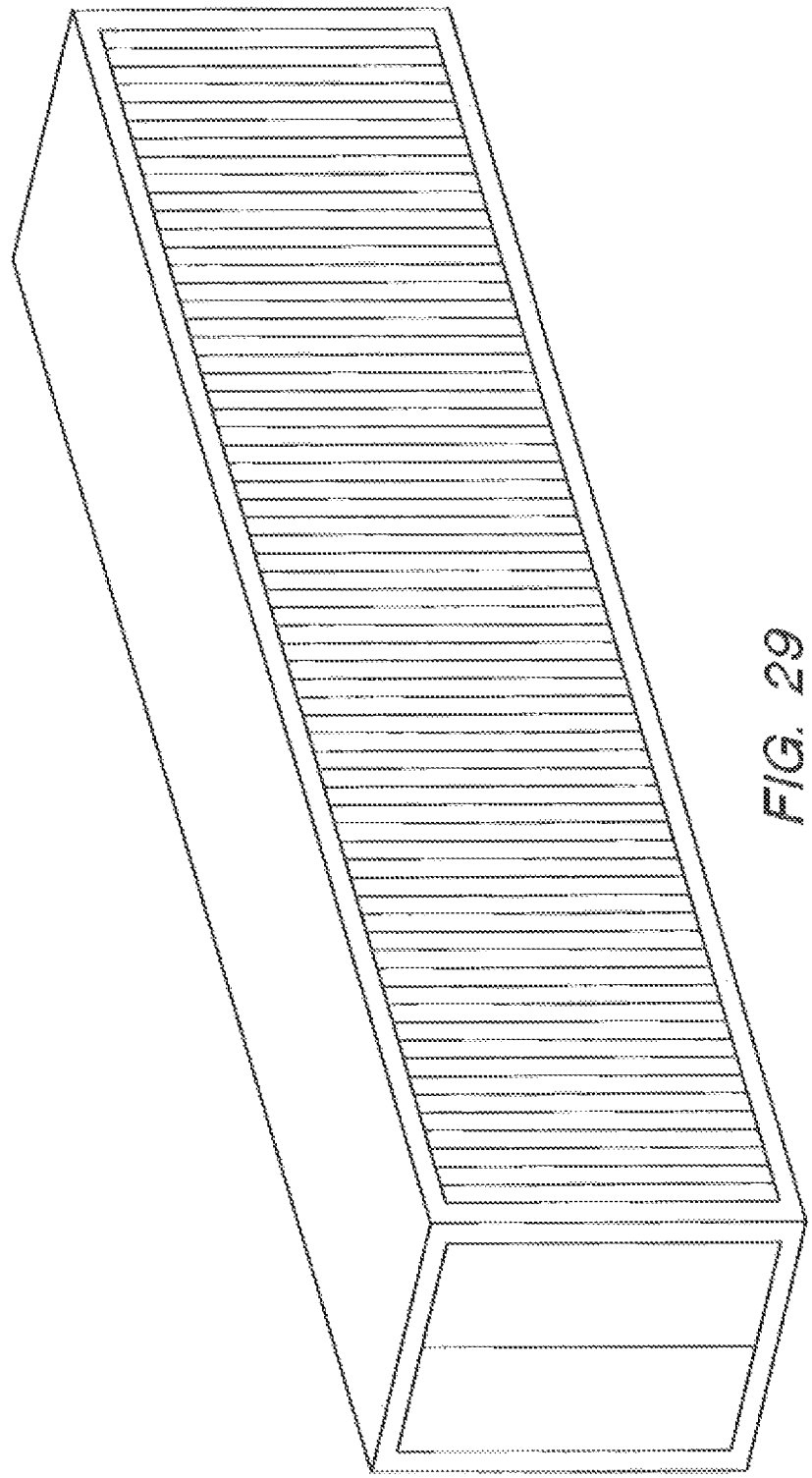
FIG. 29 is a view similar to FIG. 26 but with the water tanks retracted.

FIG. 25 illustrates a collection of cargo container modules connected together in one large unit.

FIGS. 26-29 are schematic illustrations in longitudinal cross section of a cooling tower module provided in a cargo container but wherein the water basins or reservoirs 204 are retractable into the container. In this case, as illustrated the basins are large rectangular tanks. The central portion 230 of the container has the fans, water collector media, water distribution system and mist eliminator located between the tanks in the manner described above with respect to FIGS. 21-25 and therefore the internal components are not shown.

Accordingly, the present invention enables global transportation of a cooling tower or other cooling equipment to be shipped anywhere in the world intact and complete, housed in a certified ocean container. Once the equipment reaches the docking location, it can then be put on standard trucking and shipped to location ready for operations. The set-up is minimal and the equipment can be easily and quickly put into service.

Although the invention has been described herein with reference to the specific embodiments shown in the drawings, it is to be understood that the invention is not limited to such precise embodiments and that various changes and modifications may be effected therein without departing from the scope or spirit of the invention.

What is claimed:

1. A cooling tower comprising:
   an enclosure without internal structural support for the enclosure;
   an evaporative cooling media in said enclosure;
   liquid distribution means located above said evaporative cooling media for distributing a liquid on said evaporative cooling media so that said liquid gravitates downwardly through said evaporative cooling media;
   a water collection means in said enclosure below the evaporative cooling media including a plurality of layers of liquid collecting troughs for collecting substantially all of the liquid falling from said evaporative cooling media, said troughs in each of said layers being laterally offset from the troughs in layers of troughs above or below it; and said water collection means being formed of a relatively rigid structural material in the overall shape of a beam having opposed ends, with said ends being connected to said enclosure to provide internal structural support to the evaporative cooling media; and said troughs each having at least one open end extending through the enclosure;

fan means located in said enclosure below said water collection means for blowing air upward through the evaporative cooling media thereby to cool said liquid; and a vertically extending liquid collecting tank means adjacent said enclosure, said tank means having an opening therein adjacent said at least one end of said troughs for receiving said liquid directly from said troughs.

2. The apparatus as defined in claim 1 wherein said tank means is located laterally of said fan means and said opening being located at a higher elevation relative to said one end of the troughs than said fan means.

3. An apparatus as defined in claim 1 wherein said troughs extend generally parallel to each other in said layers with the maximum spacing between troughs being less than the maximum width of an individual trough.

4. An apparatus as defined in claim 3 wherein said troughs are V shaped in transverse cross-section.

5. An apparatus as defined in claim 4 wherein said layers of troughs include a top layer having a V shaped base and vertical legs extending from the free ends of the V shaped legs to top ends defining the top of the water collection means;

a second layer of troughs below said top layer also having vertical legs extending from the free ends of the V shaped legs to top edges located below the V shaped bases of the troughs above it; and at least two additional layers of V shaped troughs below said second layer.

6. An apparatus as defined in claim 3 wherein said troughs are U shaped in transverse cross-section.

7. The apparatus as defined in claim 1, wherein the enclosure is formed of concrete blocks.

8. The apparatus as defined in claim 1, wherein said at least one open end of said troughs is mounted in its adjacent side of the enclosure at a lower elevation than its opposite end.

9. The apparatus as defined in claim 1, wherein at least one vertical web extends between each pair of layers in the plurality of layers of liquid collecting troughs.

10. The apparatus as defined in claim 9, wherein the at least one vertical web extends from a center of a trough in a first layer to a center of a trough in a second layer below the first layer.

11. The apparatus as defined in claim 10, wherein the troughs in the first and second layers have a length and the at least one vertical web extends along substantially the entire length of the troughs.

12. A cooling tower comprising:
(a) a tower enclosure;
(b) an evaporative cooling media in the enclosure;
(c) a liquid distribution system located above the evaporative cooling media for distributing a liquid on the evaporative cooling media so that the liquid gravitates downwardly through the evaporative cooling media;
(d) a liquid collection system in the enclosure below the evaporative cooling media, the liquid collection system including a plurality of layers of liquid collecting troughs for collecting substantially all of the liquid falling from the evaporative cooling media, (i) the troughs in each of the layers being laterally offset from the troughs in layers above or below it, (ii) the troughs of at least one layer having a length and a substantially vertical web extending to a lower trough along substantially the entire length of the trough, and (iii) the troughs of the at least one layer having a substantially horizontal brace extending from the troughs to an adjacent web;
(e) at least one fan located in the enclosure below the liquid collection system for blowing air upward through the evaporative cooling media to cool the liquid; and
(f) at least one liquid collecting gutter receiving the liquid from the troughs.

13. The cooling tower according to claim 12, wherein a higher layer of troughs are U-shaped with substantially vertical sidewalls and a lower layer of troughs are V-shaped with sidewalls extending at least 30 degrees from the vertical.

14. The cooling tower according to claim 13, wherein each vertical web includes at least one U-shaped trough with substantially vertical sidewalls and at least one V-shaped trough with sidewalls extending at least 30 degrees from the vertical.

15. The cooling tower according to claim 14, wherein a first vertical web terminates at a bottom of at least one trough.

16. The cooling tower according to claim 15, wherein a second vertical web, adjacent to the first vertical web, extends through at least one trough.

17. The cooling tower according to claim 12, further comprising an upper horizontal brace extending from the troughs to an adjacent web and a lower horizontal brace extending from the troughs to an adjacent web.

18. The cooling tower according to claim 12, wherein the enclosure has opposing internal ledges and the vertical webs of the troughs rest on the internal ledges.

19. The cooling tower according to claim 18, wherein the enclosure is formed of concrete blocks.

20. The cooling tower according to claim 12, wherein the gutters are positioned internally to the tower enclosure.

21. The cooling tower according to claim 12, wherein the liquid collection system communicates with at least one opening through the enclosure.

22. A cooling tower comprising:
(a) a tower enclosure;
(b) an evaporative cooling media in the enclosure;
(c) a liquid distribution system located above the evaporative cooling media for distributing a liquid on the evaporative cooling media so that the liquid gravitates downwardly through the evaporative cooling media;
(d) a liquid collection system in the enclosure below the evaporative cooling media, the liquid collection system including a plurality of layers of liquid collecting troughs for collecting the liquid falling from the evaporative cooling media, (i) the troughs in each of the layers being laterally offset from the troughs in layers above or below it, (ii) a top layer of troughs having a V shaped base and vertical legs extending from free ends of the V shaped base to top ends defining the top of the liquid collection system, (iii) a second layer of troughs below the top layer also having vertical legs extending from free ends of a V shaped base to top edges located below the V shaped bases of the troughs above it, (iv) at least two additional layers of V shaped troughs below the second layer, and (v) the liquid collection system communicating with at least one opening through the enclosure;

(e) at least one fan located in the enclosure below the liquid collection system for blowing air upward through the evaporative cooling media to cool the liquid; and (f) at least one liquid collecting tank receiving the liquid from the troughs through the at least one opening in the enclosure.

23. The cooling tower according to claim 22, wherein the troughs extend generally parallel to each other in the layers with the maximum spacing between troughs being less than the maximum width of an individual trough.

24. The cooling tower according to claim 22, wherein the evaporative cooling media and liquid distribution system are supported in the enclosure on the liquid collection system.

* * * * *